US012750154B2

(12) United States Patent
Spits et al.

(10) Patent No.: US 12,750,154 B2
(45) Date of Patent: Sep. 29, 2026

(54) ADAPTIVE JAMMER DETECTION

(71) Applicant: Qualcomm Incorporated, San Diego, CA (US)

(72) Inventors: Erwin Spits, Utrecht (NL); Francesco Gatta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 18/470,846

(22) Filed: Sep. 20, 2023

(65) Prior Publication Data

US 2025/0096923 A1 Mar. 20, 2025

(51) Int. Cl.
*H04K 3/00* (2006.01)

(52) U.S. Cl.
CPC .................................... *H04K 3/22* (2013.01)

(58) Field of Classification Search
CPC .. H04K 3/22; H04K 3/00; H04K 3/20; H04K 3/224; H04K 3/25; H04K 3/42; H04K 3/43; H04K 3/44; H04K 3/45; H04K 3/86; H04K 2203/00
See application file for complete search history.

(56) References Cited

U.S. PATENT DOCUMENTS

2005/0266803 A1 12/2005 Dinur et al.
2014/0153543 A1* 6/2014 Shipley ................. H04W 88/02 370/331
2023/0087488 A1* 3/2023 Li ........................ H04B 17/336 370/329
2023/0170862 A1* 6/2023 Nakagawa ........... H04B 1/0458 330/291
2024/0272270 A1* 8/2024 Longman .............. G01S 13/931

FOREIGN PATENT DOCUMENTS

CN 116633464 A 8/2023

OTHER PUBLICATIONS (JP 11252040 A), Sato et al., OFDM Receiver, Sep. 1999, pp. 1-9 (Year: 1999).*
International Search Report and Written Opinion—PCT/US2024/043854—ISA/EPO—Nov. 8, 2024.

* cited by examiner

*Primary Examiner* — Keith Ferguson
(74) *Attorney, Agent, or Firm* — Loza & Loza LLP

(57) ABSTRACT

An apparatus is disclosed for adaptive jammer detection. In example aspects, the apparatus includes at least one communication processor and wireless circuitry. The at least one communication processor is configured to determine a performance indication corresponding to a received signal. The at least one communication processor is also configured to adjust a jammer detection threshold based on the performance indication to produce an adjusted jammer detection threshold. The wireless circuitry is coupled to the at least one communication processor and includes a jammer detector. The jammer detector is configured to detect a first jamming signal based on the jammer detection threshold and to detect a second jamming signal based on the adjusted jammer detection threshold.

26 Claims, 10 Drawing Sheets

ADAPTIVE JAMMER DETECTION

TECHNICAL FIELD

This disclosure relates generally to signal communication or signal processing using an electronic device and, more specifically, to jammer detection adaptability.

BACKGROUND

Electronic devices include traditional computing devices such as desktop computers, notebook computers, smartphones, wearable devices like a smartwatch, internet servers, and so forth. Electronic devices also include other types of computing devices such as personal voice assistants (e.g., smart speakers), wireless access points or routers, thermostats and other automated controllers, robotics, automotive electronics, devices embedded in other machines like refrigerators and industrial tools, Internet of Things (IoT) devices, medical devices, and so forth. These various electronic devices provide services relating to productivity, communication, social interaction, security, health and safety, remote management, entertainment, transportation, and information dissemination. Thus, electronic devices play crucial roles in modern society.

Many of the services provided by electronic devices in today's interconnected world depend at least partly on electronic communications. Electronic communications can include, for example, those exchanged between two or more electronic devices using wireless or wired signals that are transmitted over one or more networks, such as the Internet, a Wi-Fi® network, or a cellular network. Electronic communications can therefore include wireless or wired transmissions and receptions. To transmit and receive communications, an electronic device can use a transceiver, such as a wireless transceiver that is designed for wireless communications.

Some electronic communications can thus be realized by propagating signals between two wireless transceivers at two different electronic devices. For example, using a wireless transmitter, a smartphone can transmit a wireless signal to a base station over the air as part of an uplink communication to support mobile services. Using a wireless receiver, the smartphone can receive a wireless signal that is transmitted from the base station via the air medium as part of a downlink communication to enable mobile services. In such cases, the base station can also have a wireless transceiver, including a wireless transmitter and a wireless receiver to participate in the wireless communications. With a smartphone, for instance, mobile services can include making voice and video calls, participating in social media interactions, sending messages, watching movies, sharing videos, performing searches, using map information or navigational instructions, finding friends, engaging in location-based services generally, transferring money, obtaining another service like a car ride, and so forth.

Many mobile and other communication-based services depend at least partly on the transmission or reception of wireless signals between two or more electronic devices. Consequently, researchers, electrical engineers, and other designers of electronic devices strive to develop wireless transceivers that can use wireless signals effectively to provide these and other mobile services.

SUMMARY

In wireless communications, a jamming signal can interfere with obtaining a desired signal. For example, a jamming signal can overpower the desired signal or even damage receiver circuitry. Operations undertaken to counteract a jamming signal, however, can also adversely affect receiving or correctly interpreting the desired signal. In some approaches to handling jamming signals, jammer detection is set to occur at a relatively high threshold such that signal degradation is experienced before a jammer detector activates. In other approaches, jammer detection is set to occur at a relatively low threshold such that jamming countermeasures are engaged well before signal degradation would otherwise occur. Both such fixed-threshold approaches can be deleterious to the desired signal, such as by reducing connection quality. In described example approaches, a jammer detection threshold is adapted responsive to at least one signal performance indication or one or more operational conditions. The jammer detector can be implemented in relatively faster hardware, such as in a transceiver or a radio-frequency front-end, with a register that stores a jammer detection threshold. The signal performance indication can be monitored using relatively slower software, such as that executed by a communication processor. An algorithm executing on the communication processor can adjust the jammer detection threshold stored in the register of the hardware jammer detector. Additionally or alternatively, associations between a respective jammer detection threshold and one or more operational conditions can be stored and accessed subsequently to "jumpstart" the determining of a new jammer detection threshold. The analysis and use of such associations can be facilitated with a machine learning algorithm, such as through unsupervised binning of thresholds and operational conditions. These and other implementations are described herein.

In an example aspect, an apparatus for adaptive jammer detection is disclosed. The apparatus includes at least one communication processor and wireless circuitry. The at least one communication processor is configured to determine a performance indication corresponding to a received signal. The at least one communication processor is also configured to adjust a jammer detection threshold based on the performance indication to produce an adjusted jammer detection threshold. The wireless circuitry is coupled to the at least one communication processor and includes a jammer detector. The jammer detector is configured to detect a first jamming signal based on the jammer detection threshold and to detect a second jamming signal based on the adjusted jammer detection threshold.

In an example aspect, an apparatus for adaptive jammer detection is disclosed. The apparatus includes jammer detector circuitry configured to detect jamming signals based on a programmable jammer detection threshold. The apparatus also includes means for adjusting the programmable jammer detection threshold based on a performance indication of a received signal.

In an example aspect, a method for adaptive jammer detection or adjusting a jammer detection threshold responsive to a signal performance indication is disclosed. The method includes detecting, by jammer detection circuitry, a first jamming signal based on a first jammer detection threshold. The method also includes determining, by at least one communication processor, a performance indication corresponding to a received signal. The method additionally includes adjusting, by the at least one communication processor, the first jammer detection threshold based on the performance indication to produce a second jammer detection threshold. The method further includes detecting, by the jammer detection circuitry, a second jamming signal based on the second jammer detection threshold.

In an example aspect, an apparatus for adaptive jammer detection is disclosed. The apparatus includes jammer detector circuitry configured to detect jamming signals based on a programmable jammer detection threshold. The apparatus also includes a jammer detection controller configured to initialize the programmable jammer detection threshold based on relationships between jammer detection thresholds and one or more operational conditions.

DETAILED DESCRIPTION

Introduction and Overview

Figure 1:
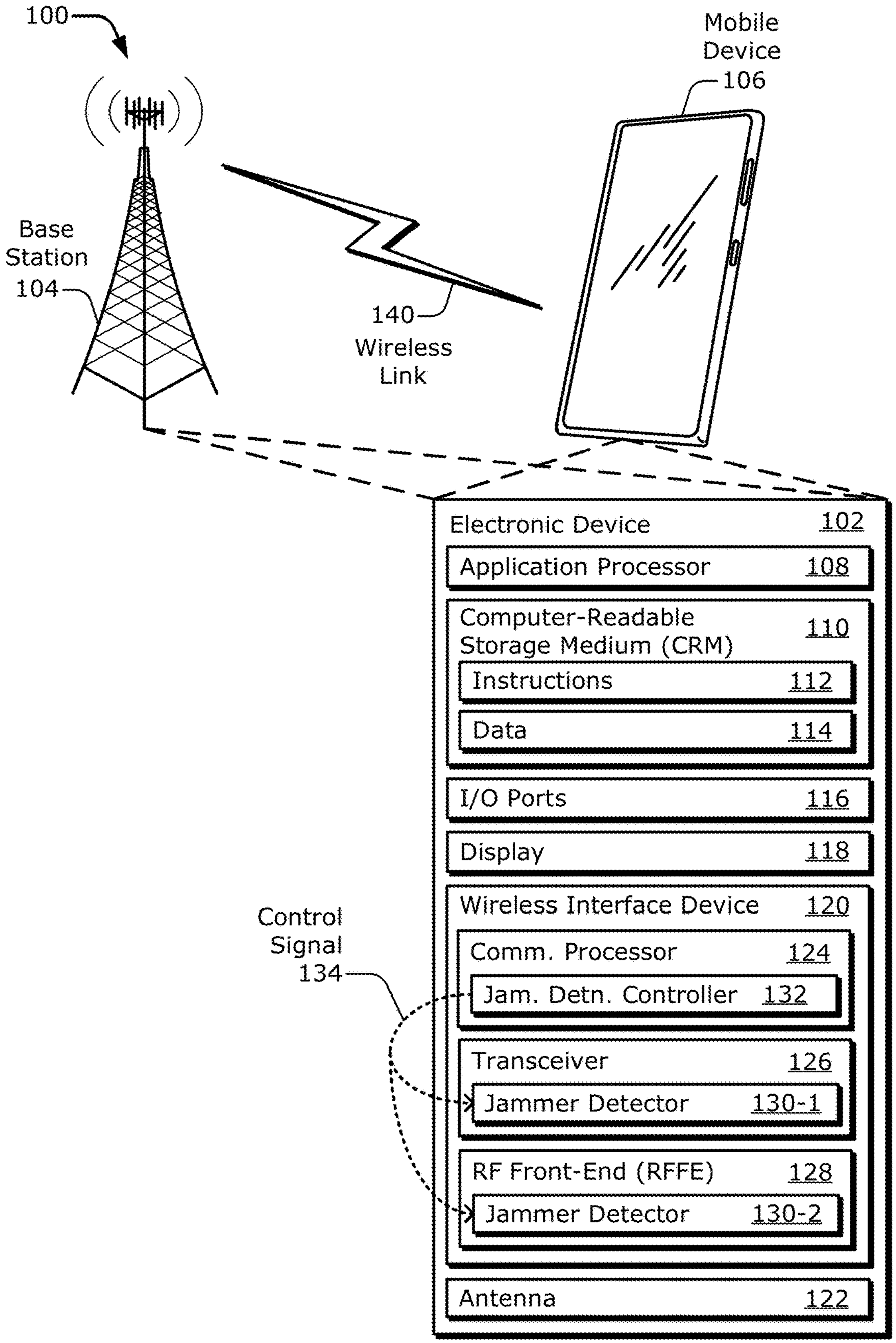
FIG. 1 illustrates an environment with an example electronic device that has a wireless interface device, which includes a jammer detector and a jammer detection controller.

While using wireless signaling for communication, a jamming signal can interfere with receiving a desired signal. For example, a jamming signal can overpower the desired signal, especially if the two signals have an overlapping frequency range. A high-powered jamming signal can also overdrive receiver circuitry to an extent that demodulating and correctly interpreting the desired signal becomes difficult. Although some countermeasures can be activated to combat jamming signals, these countermeasures may also degrade the received signals. Further, the nature of jamming signals can vary over time based on device location, device usage, and so forth.

The radio-frequency (RF) environments that an electronic device is subject to are changing continuously depending on device location and usage. For example, jamming signals, or jammers, that interfere with wireless signaling performance vary depending on the environment. Certain control algorithms for jammer detection can benefit by observing the current signaling environment an electronic device is experiencing to better balance jammer protection versus efficiency. Generally, relatively faster control algorithms can preserve more connection subframes, which results in a superior link quality, as compared to relatively slower control algorithms. Although hardware controllers can typically operate faster than software-based controllers, hardware controllers may not offer the sophistication to monitor higher-level aspects of a link connection, such as signal-to-noise ratio (SNR).

In some approaches, jammer detection thresholds that are implemented in hardware are either significantly higher or lower than is appropriate given the actual impact level of a detectable jammer on signal performance metrics. In one case, the jammer detection threshold is set based on the damage level of a low-noise amplifier (LNA). In this case, a jammer causes signal degradation before the jammer detector activates a protection path or performs some other countermeasure. In another case, the jammer detection threshold is set to be relatively conservative. In this "opposite" case, the jammer detector activates the protection path, which may also cause adverse performance, well before any signal degradation from the jammer is observed.

Semi-autonomous or hardware jammer detection is useful because countermeasure activation can occur appreciably faster in hardware than in software. For example, hardware can activate a jammer countermeasure two to three orders of magnitude faster, such as in microseconds instead of milliseconds. Accordingly, connection quality, such as a given key performance indicator (KPI), can be protected more effectively with hardware jammer detection. Further, processor-side algorithms can be relatively slow due to the noisy nature of the incoming received signals. Because hardware jammer detection is simpler than processor-based algorithms, adapting a threshold level that triggers the hardware jammer detection based on a specific current jammer and/or signal performance indication can make reaction times appreciably faster and/or improve connection quality.

In example implementations, a jammer detection threshold is adapted responsive to current signaling conditions. A jammer detector can be implemented in relatively faster hardware, such as in a transceiver or a radio frequency front-end portion of a wireless interface device. The jammer detector may include a register that stores a jammer detection threshold. At least one performance indication can be monitored using relatively slower software, such as that executed by a communication processor of the wireless interface device. An algorithm executing on the communication processor can adjust the jammer detection threshold stored in the register of the hardware jammer detector based on the performance indication.

Additionally or alternatively, associations between a respective jammer detection threshold and one or more operational conditions can be stored. These associations can be accessed subsequently to accelerate the determination of another jammer detection threshold. For example, an initial jammer detection threshold can be obtained using the historical associations. The analysis and use of such associations can be facilitated with a machine learning algorithm. In some cases, unsupervised machine learning can be used to bin the associations between jammer detection thresholds and operational conditions. These bins may correspond to categories that can be used to extrapolate future jammer detection thresholds, including starting threshold levels that are then adjusted further.

By way of example only, jammer detection can be used together with an SNR estimator to determine a superior state in which to enable receiver performance enhancement, such as the bypassing of filters that are capable of rejecting jamming signals. In some systems, the SNR estimator may not be sufficiently fast or may be unavailable to determine the appropriate state for activating the receiver performance enhancement. For instance, because activating a filter mode can result in high filter loss, the filters may be bypassed as a default. If a jammer (e.g., a Wi-Fi transmit jammer) becomes present, however, the filter mode is activated. If the system relies purely on a software algorithm, connection quality may be significantly impacted before the filter path is switched in. A hardware jammer detector, on the other hand, can be used in such situations. Further, a hardware jammer detector with a dynamically adjusted jammer detection threshold can be employed. With an adjustable jammer detection threshold, a slower software-based controller can adapt the jammer detection threshold based on the current signal performance indications, such as SNR.

In some aspects, a hardware-implemented jammer detector can operate "slightly" below a one-decibel gain compression point (P1dB) of an associated LNA that the jammer detector is protecting. The 1-dB gain compression point can correspond to a power level that causes the gain of the amplifier to drop by 1 dB from its small signal value. An optimum jammer detection threshold may depend on the nature of the jammer signal, such as a peak-to-average power ratio (PAPR) thereof. Thus, a saturation state of an LNA may be used to guide the adjustment of a jammer detection threshold.

In other example implementations, a jammer detector circuit in hardware has a programmable jammer threshold, which may be stored in a register. In operation, an algorithmic process performed by a communication processor (e.g., a modem) can determine a threshold level at which the jammer starts impacting signal quality at the modem, such as by recognizing a decreasing SNR. The algorithmic process may gradually adjust the jammer detection threshold of the jammer detector circuit to a value that is "slightly" below (e.g., 1-3 units or 5-10% below) the threshold level at which KPI impacts are measured due to the jammer. Decisions by the slower software algorithm can thus be replaced gradually by the faster jammer protection provided by the hardware jammer detector. This can improve wireless communication KPI's by reducing, and at times minimizing, a quantity of subframes that are impacted by the jamming signal and/or by jammer countermeasures that are implemented by choice instead of necessity.

In these manners, the greater intelligence and flexibility offered by software signal analysis can be combined with the faster response time of a hardware jammer detector. A communication processor can measure a performance indication of a received signal using an algorithmic process. The communication processor can further adjust a jammer detection threshold based on the measured performance indication. The hardware jammer detector can then detect jammers using the adjusted jammer detection threshold. This enables sub-millisecond jammer detection by the hardware and provides multiple parameters for tuning the jammer detection threshold, including those that take longer to calculate or are too complicated to compute them feasibly in hardware. These and other implementations are described herein.

DESCRIPTION EXAMPLES

FIG. 1 illustrates an example environment 100 with an electronic device 102 that has a wireless interface device 120, which includes a jammer detector 130 and a jammer detection controller 132. This document describes example implementations of the jammer detector 130, which may be part of a radio-frequency front-end (RFFE), a transceiver, and so forth of an apparatus. This document also describes example implementations of how the jammer detection controller 132 can at least partially control operation of the jammer detector 130. The jammer detection controller 132 may be part of a communication processor 124. As shown, two examples of an electronic device 102 include a mobile device 106 and a base station 104. In the environment 100, the mobile device 106 communicates with the base station 104, and vice versa, through a wireless link 140.

In FIG. 1, the example electronic device 102 is depicted as a smartphone or a base station tower. The electronic device 102, however, may be implemented as any suitable computing or other electronic device. Examples of an apparatus that can be realized as an electronic device 102 include a cellular base station, broadband router, access point, cellular or mobile phone, gaming device, navigation device, media device, laptop computer, desktop computer, tablet computer, and server computer. Other examples of an apparatus that can be realized as an electronic device 102 include a network-attached storage (NAS) device, smart appliance, vehicle-based communication system, Internet of Things (IoT) device, sensor or security device, asset tracker, fitness management device, wearable device such as intelligent glasses or smartwatch, wireless power device (transmitter or receiver), medical device, and so forth. An electronic device 102 may be referred to with different terminology, such as a base station (BS), a user equipment (UE), or a customer premises equipment (CPE).

Without loss of generality, the base station 104 can communicate with the mobile device 106 via the wireless link 140, which may be implemented as any suitable type of wireless link that carries a communication signal. Although depicted as a base station tower of a cellular radio network, the base station 104 may represent or be implemented as another device, such as a satellite, terrestrial broadcast tower, access point, customer premises equipment (CPE), peer-to-peer device, mesh network node, fiber optic line interface, another electronic device as described above generally, and so forth. Hence, the wireless link 140 can extend between the mobile device 106 and the base station 104 in any of various manners.

The wireless link 140 can include a downlink of data or control information communicated from the base station 104 to the mobile device 106. The wireless link 140 can also include an uplink of other data or control information communicated from the mobile device 106 to the base station 104. The wireless link 140 may be implemented using any suitable wireless communication protocol or standard. Examples of such protocols and standards include a 3$^{rd}$ Generation Partnership Project (3GPP) Long-Term Evolution (LTE) standard, such as a 4$^{th}$ Generation (4G), a 5$^{th}$ Generation (5G), or a 6$^{th}$ Generation (6G) cellular standard; an IEEE 802.11 standard, such as 802.11g, ac, ax, ad, aj, or ay standard (e.g., Wi-Fi® 6 or WiGig®); an IEEE 802.16 standard (e.g., WiMAX®); a Bluetooth® standard; an ultra-wideband (UWB) standard (e.g., IEEE 802.15.4); and so forth. In some implementations, the wireless link 140 may provide power wirelessly, and the mobile device 106 or the base station 104 may comprise a power source or a power sink.

As shown for some implementations, the electronic device 102 can include at least one application processor 108 and at least one computer-readable storage medium 110

(CRM 110). The application processor 108 may include any type of processor, such as a central processing unit (CPU) or a multi-core processor, that is configured to execute processor-executable instructions (e.g., code) stored by the CRM 110. The CRM 110 may include any suitable type of data storage media, such as volatile memory (e.g., random-access memory (RAM)), non-volatile memory (e.g., Flash memory), optical media (e.g., a disc), magnetic media (e.g., a disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include one or more input/output ports 116 (I/O ports 116) and at least one display 118. The I/O ports 116 enable data exchanges or interaction with other devices, networks, or users. The I/O ports 116 may include serial ports (e.g., universal serial bus (USB®) ports), Ethernet ports, parallel ports, audio ports, infrared (IR) ports, camera or other sensor ports, and so forth. The display 118 can be realized as a display screen or a projection that presents graphical images provided by other components of the electronic device 102, such as a user interface (UI) associated with an operating system, program, or application. Alternatively or additionally, the display 118 may be implemented as a display port or virtual interface through which graphical content of the electronic device 102 is communicated or presented.

The electronic device 102 further includes at least one wireless interface device 120 and at least one antenna 122. The example wireless interface device 120 provides connectivity to respective networks and peer devices via a wireless link, which may be configured similarly to or differently from the wireless link 140. The wireless interface device 120 may facilitate communication over any suitable type of wireless network, such as a wireless local area network (LAN) (WLAN), wireless personal-area-network (PAN) (WPAN), peer-to-peer (P2P) network, mesh network, cellular network, wireless wide-area-network (WAN) (WWAN), and/or navigational network (e.g., the Global Positioning System (GPS) of North America or another Satellite Positioning System (SPS) or Global Navigation Satellite System (GNSS)). In the context of the example environment 100, the electronic device 102 can communicate various data and control information bidirectionally with another device (e.g., engage in communications between the base station 104 and the mobile device 106) via the wireless interface device 120. The electronic device 102 may, however, communicate directly with other peer devices, an alternative wireless network, and the like. Also, as described above, an electronic device 102 may alternatively be implemented as another apparatus as set forth herein.

As shown in FIG. 1, the wireless interface device 120 can include at least one communication processor 124, at least one transceiver 126, and at least one radio-frequency front-end 128 (RFFE 128). These components process data information, control information, and signals associated with communicating information for the electronic device 102 via the antenna 122. The communication processor 124 may be implemented as at least part of a system-on-chip (SoC), as a modem processor, or as a baseband radio processor (BBP) that enables a digital communication interface for data, voice, messaging, or other applications of the electronic device 102. The communication processor 124 can include a digital signal processor (DSP), a modem, or one or more signal-processing blocks (not shown) for encoding and modulating data for transmission and for demodulating and decoding received data. Additionally, the communication processor 124 may also manage (e.g., control or configure) aspects or operation of the transceiver 126, the RF front-end 128, and other components of the wireless interface device 120 to implement various communication protocols or communication techniques.

In some cases, the application processor 108 and the communication processor 124 (or other processor(s)) can be combined into one module or integrated circuit (IC), such as an SoC. Regardless, the application processor 108, the communication processor 124, or another processor generally can be operatively coupled to one or more other components, such as the CRM 110 or the display 118, to enable control of, or other interaction with, the various components of the electronic device 102. For example, at least one processor 108 or 124 can present one or more graphical images on a display screen implementation of the display 118 based on one or more wireless signals communicated (e.g., transmitted or received) via the at least one antenna 122 using components of the wireless interface device 120.

Other examples of a processor include an artificial intelligence (AI) accelerator, an AI engine, a graphics processor, a media processor, a microprocessor, a security coprocessor, a DSP, a combination thereof, and so forth. Further, the application processor 108, the communication processor 124, or another processor, including a combination thereof, can be realized using digital circuitry that implements logic or functionality that is described herein. Additionally, the communication processor 124 may also include or be associated with a memory (not separately depicted) to store data and processor-executable instructions (e.g., code), such as the same CRM 110 or another CRM.

As shown, the wireless interface device 120 can include at least one jammer detector 130, which is described herein. More specifically, the transceiver 126 can include at least one jammer detector 130-1, or the RF front-end 128 can include at least one jammer detector 130-2 (including both components can have at least one jammer detector 130 in accordance with an optional, but permitted herein, "inclusive-or" interpretation of the word "or"). The transceiver 126 can also include circuitry and logic for filtering, switching, amplification, channelization, frequency translation, and so forth.

Frequency translation functionality may include an up-conversion or a down-conversion of frequency that is performed through a single conversion operation (e.g., with a direct-conversion architecture) or through multiple conversion operations (e.g., with a superheterodyne architecture). The transceiver 126 can perform such frequency conversion (e.g., frequency translation) by using a mixer circuit (e.g., of FIG. 2, but not shown in FIG. 1). Generally, the transceiver 126 can include filters, switches, amplifiers, mixers, and so forth for routing and conditioning signals that are transmitted or received via the antenna 122.

Figure 2:
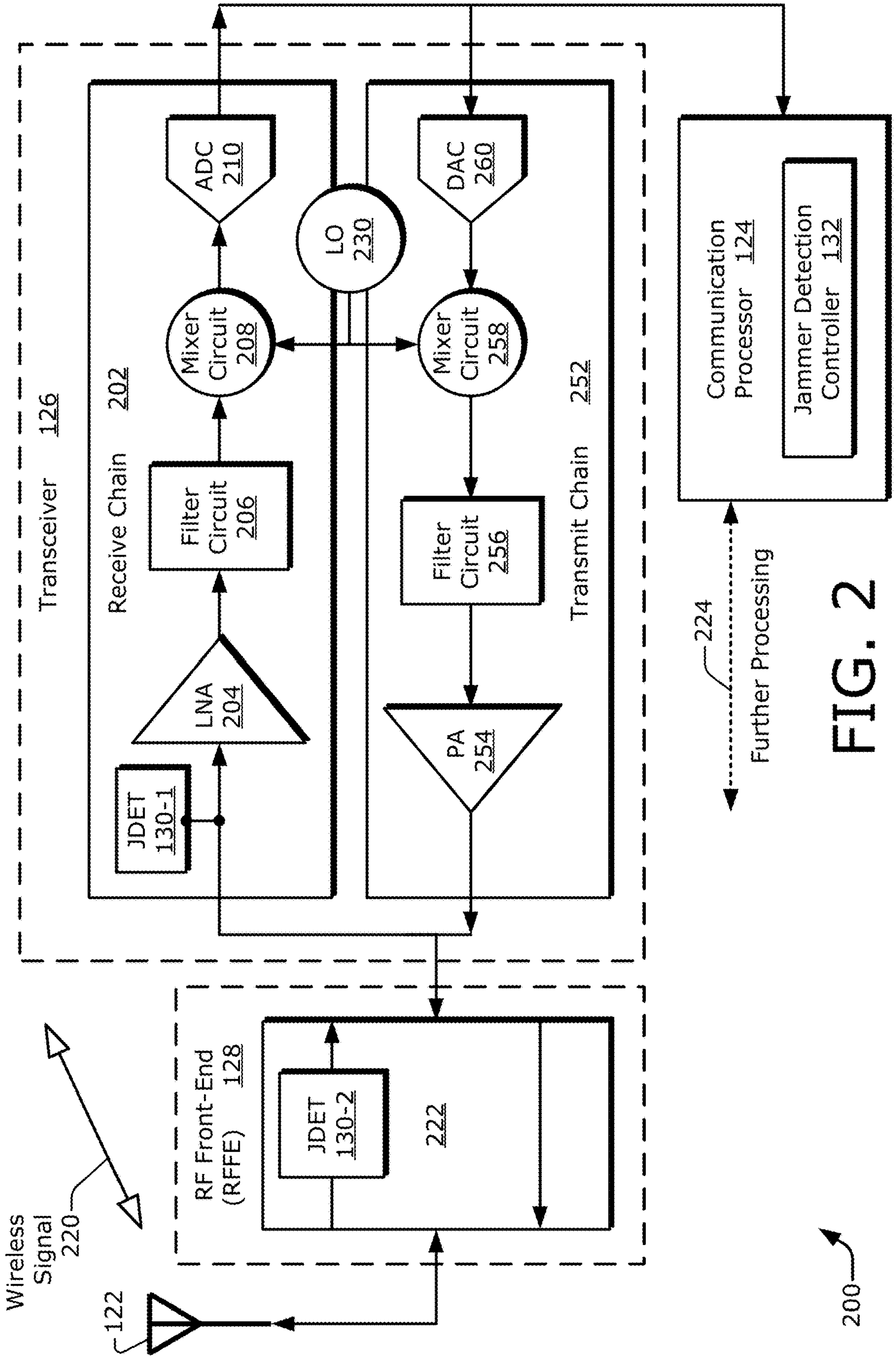
FIG. 2 is a schematic diagram illustrating an example radio-frequency (RF) front-end and an example transceiver that can each include a jammer detector.

In addition to the jammer detector 130-1, the transceiver 126 can include an analog-to-digital converter (ADC) or a digital-to-analog converter (DAC) (e.g., of FIG. 2, but not shown in FIG. 1). In operation, an ADC can convert analog signals to digital signals, and a DAC can convert digital signals to analog signals. Generally, an ADC or a DAC can be implemented as part of the communication processor 124, as part of the transceiver 126, or separately from both (e.g., as another part of an SoC or as part of the application processor 108).

The components or circuitry of the transceiver 126 can be implemented in any suitable fashion, such as with combined transceiver logic or separately as respective transmitter and receiver entities. In some cases, the transceiver 126, or the RF front-end 128, is implemented with multiple or different sections to implement respective transmitting and receiving operations (e.g., with separate transmit and receive chains as depicted in FIG. 2). Although not shown in FIG. 1, the transceiver 126 may include logic to perform in-phase/quadrature (I/Q) operations, such as synthesis, phase correction, modulation, demodulation, and the like.

The RF front-end 128 can also include jammer-related hardware-such as the jammer detector 130-2, one or more filters, one or more switches, or one or more amplifiers for conditioning signals received via the antenna 122 or for conditioning signals to be transmitted via the antenna 122. The RF front-end 128 may also include a local oscillator, phase shifter (PS), peak detector, power meter, gain control block, antenna tuning circuit, N-plexer, balun, and the like. Configurable components of the RF front-end 128, such as some phase shifters, an automatic gain controller (AGC), or a reconfigurable or programmable version of the jammer detector 130-2, may be controlled by the communication processor 124 to implement communications in various modes, with different frequency bands, using beamforming, to reduce noise or nonlinearity, or to otherwise improve signal quality. The communication processor 124 can similarly control operation of one or more components of the transceiver 126, such as the jammer detector 130-1.

In some implementations, the antenna 122 is implemented as at least one antenna array that includes multiple antenna elements. Thus, as used herein, an "antenna" can refer to at least one discrete or independent antenna, to at least one antenna array that includes multiple antenna elements, or to a portion of an antenna array (e.g., an antenna element), depending on context or implementation.

In example implementations, the wireless interface device 120 includes at least one jammer detector 130. As shown, a jammer detector 130 may be positioned at the transceiver 126, at the RF front-end 128, or at both, including by being distributed across two or more sections or parts of the wireless interface device 120. In FIG. 1, at least one jammer detector 130 is depicted as being part of a transceiver 126 as a jammer detector 130-1, as being part of an RF front-end 128 as a jammer detector 130-2, and so forth. Further, the wireless interface device 120 includes at least one jammer detection controller 132. As shown, a jammer detection controller 132 may be positioned at the communication processor 124. A jammer detection controller 132 may, however, additionally or alternatively be part of another processor, such as the application processor 108 or an SoC (not shown).

As set forth above, a jammer detector 130 or a jammer detection controller 132 can be included in an electronic device besides a cell phone, such as a base station 104 or wireless access point. The jammer detector 130 can be coupled to, for instance, a low-noise amplifier (LNA) as described herein. However, a jammer detector 130 can be deployed separately from an LNA, such as if the LNA is part of the RF front-end 128 and the jammer detector 130 is part of the transceiver 126, or vice versa. Other electronic device apparatuses that can employ a jammer detector 130 or a jammer detection controller 132 include a laptop, communication hardware of a vehicle, a wearable device, and so forth as described herein.

In example implementations, the jammer detector 130 of the RF front-end 128 or the transceiver 126 can detect a jamming signal based on a jammer detection threshold. This enables the jammer detector 130 to be realized in hardware circuitry that can react relatively quickly to the introduction or presence of the jamming signal. The jammer detection controller 132 of the communication processor 124 can adjust the jammer detection threshold that is used by the jammer detector 130 based on a performance indication of a received signal, such as signal-to-noise ratio (SNR). The jammer detection controller 132 may use, for instance, a control signal 134 to communicate with, instruct, or control a jammer detector 130, such as to load an adjusted jammer detection threshold for use by the jammer detector 130. Although operation of the jammer detection controller 132 is relatively slower, this enables the jammer detection threshold to be adapted with more intelligence or using information obtained over a longer period.

In some cases, the jammer detection controller 132 can use artificial intelligence to create or apply a machine learning model. The machine learning model may initialize the jammer detection threshold based on historical values of the jammer detection threshold in conjunction with one or more associated operational conditions. Operational conditions can include, for example, transmit power, Bluetooth® status, device location, and so forth. Example machine learning-related implementations, and other implementations that may leverage historical information on jammer detection thresholds, are described below with reference to FIG. 5. Example general procedures and apparatuses for adaptive jammer detection are described below with reference to FIGS. 3 and 4. Next, however, this document describes with reference to FIG. 2 example implementations of a transceiver and an RF front-end that can include at least one jammer detector 130.

FIG. 2 is a schematic diagram of circuitry 200 illustrating an example RF front-end 128 and an example transceiver 126 that can each include at least one jammer detector 130, which may be coupled to at least one low-noise amplifier 204. FIG. 2 also depicts an antenna 122 and a communication processor 124. The communication processor 124 communicates one or more data signals to other components, such as the application processor 108 of FIG. 1, for further processing at 224 (e.g., for processing at an application level) for reception operations. For transmission operations, the communication processor 124 communicates one or more data signals from other components to the transceiver 126. As described herein, the communication processor 124 can also include at least one instance of a jammer detection controller 132.

As shown, the circuitry 200 can include at least one jammer detector 130, a first jammer detector 130-1 (JDET 130-1), a second jammer detector 130-2 (JDET 130-2), or a jammer detection controller 132. Although a single jammer detector 130 is shown in each of the RF front-end 128 and the transceiver 126, either or both parts may include multiple instances of a jammer detector 130. Further, the circuitry 200 may include a different quantity of LNAs, jammer detectors, or jammer detection controllers (e.g., more or fewer); may include such components at different locations; may include such components in manners in which they are coupled together differently; and so forth.

As illustrated from left to right, in example implementations, the antenna 122 is coupled to the RF front-end 128, and the RF front-end 128 is coupled to the transceiver 126. The transceiver 126 is coupled to the communication processor 124. The example RF front-end 128 includes at least one signal propagation path 222. The at least one signal propagation path 222 can include at least one jammer detector 130, such as the second jammer detector 130-2. The example transceiver 126 includes at least one receive chain 202 (or receive path 202) and at least one transmit chain 252 (or transmit path 252). Although only one RF front-end 128, one transceiver 126, and one communication processor 124 are shown at the circuitry 200, an electronic device 102, or a wireless interface device 120 thereof, can include multiple instances of any or all such components. Also, although only certain components are explicitly depicted in FIG. 2 and are shown coupled together in a particular manner, the transceiver 126 or the RF front-end 128 may include other non-illustrated components (e.g., switches, diplexers, or power detectors), more or fewer components, differently coupled arrangements of components, and so forth.

In some implementations, the RF front-end 128 couples the antenna 122 to the transceiver 126 via the signal propagation path 222. In operation, the signal propagation path 222 carries a signal between the antenna 122 and the transceiver 126. During or as part of the signal propagation, the signal propagation path 222 conditions the propagating signal. This may include operation of the second jammer detector 130-2 in conjunction with a low-noise amplifier 204 (LNA 204) of the transceiver 126 or an LNA (not shown) of the signal propagation path 222. This enables the RF front-end 128 to couple a wireless signal 220 from the antenna 122 to the transceiver 126 as part of a reception operation. The RF front-end 128 also enables a transmission signal to be coupled from the transceiver 126 to the antenna 122 as part of a transmission operation to emanate a wireless signal 220. Although not explicitly shown in FIG. 2, an RF front-end 128, or a signal propagation path 222 thereof, may include one or more other components, such as a mixer, a filter, an amplifier (e.g., a power amplifier (PA) or a low-noise amplifier (LNA)), an N-plexer, a phase shifter, a transformer, a diplexer, one or more switches, and so forth.

In some implementations, the transceiver 126 can include at least one receive chain 202, at least one transmit chain 252, or at least one receive chain 202 and at least one transmit chain 252. From left to right, the receive chain 202 can include the low noise amplifier 204 (LNA 204), a filter circuit 206, a mixer circuit 208 for frequency down-conversion, and an ADC 210. The transmit chain 252 can include a power amplifier 254 (PA 254), a filter circuit 256, a mixer circuit 258 for frequency up-conversion, and a DAC 260. However, the receive chain 202 or the transmit chain 252 can include other components—for example, additional mixers, multiple filters, at least one transformer, one or more buffers, or at least one phase-locked loop—that are electrically or electromagnetically coupled anywhere along the depicted receive and transmit chains.

The receive chain 202 is coupled between the signal propagation path 222 of the RF front-end 128 and the communication processor 124—e.g., via the low-noise amplifier 204 and the ADC 210, respectively. The transmit chain 252 is coupled between the signal propagation path 222 and the communication processor 124—e.g., via the power amplifier 254 and the DAC 260, respectively. The transceiver 126 can also include at least one local oscillator 230 (LO 230) that is coupled to the mixer circuit 208 or the mixer circuit 258, including to both mixer circuits. For example, the transceiver 126 can include one local oscillator 230 for each transmit/receive chain pair, one local oscillator 230 per transmit chain and one local oscillator 230 per receive chain, multiple local oscillators 230 per transmit or receive chain, and so forth. Mixer circuit(s) of the RF front-end 128, if present, may be coupled to the same local oscillator 230 or to a different local oscillator (not shown in FIG. 2).

As depicted along a signal propagation direction for certain example implementations of the receive chain 202, the antenna 122 is coupled to the low noise amplifier 204 via the signal propagation path 222, and the low noise amplifier 204 is coupled to the filter circuit 206. The filter circuit 206 is coupled to the mixer circuit 208, and the mixer circuit 208 is coupled to the ADC 210. The ADC 210 is in turn coupled to the communication processor 124. As depicted along a signal propagation direction for certain example implementations of the transmit chain 252, the communication processor 124 is coupled to the DAC 260, and the DAC 260 is coupled to the mixer circuit 258. The mixer circuit 258 is coupled to the filter circuit 256, and the filter circuit 256 is coupled to the power amplifier 254. The power amplifier 254 is coupled to the antenna 122 via the signal propagation path 222. Although only one receive chain 202 and one transmit chain 252 are explicitly shown, an electronic device 102, or a transceiver 126 thereof, can include multiple instances of either or both components. Although the ADC 210 and the DAC 260 are illustrated as being separately coupled to the communication processor 124, they may share a bus or other means for communicating with the processor 124.

As part of an example signal-receiving operation, the signal propagation path 222 forwards a received signal (e.g., as an intermediate frequency (IF) signal if the RF front-end 128 includes a mixer or as an RF signal otherwise) to the low-noise amplifier 204. The low-noise amplifier 204 accepts the forwarded receive signal from the RF front-end 128 and provides an amplified signal to the filter circuit 206 based on the accepted signal. The filter circuit 206 filters the amplified signal and provides a filtered signal to the mixer circuit 208.

The mixer circuit 208 performs a frequency down-conversion operation on the filtered signal to down-convert from one frequency to a lower frequency (e.g., from the IF to a baseband frequency (BBF) if the RF front-end 128 has a mixer or from an RF to an IF or BBF in the absence of such a mixer in the RF front-end 128). The mixer circuit 208, or multiple mixer circuits, can perform the frequency down-conversion in a single conversion step or through multiple conversion steps using at least one local oscillator 230. The mixer circuit 208 can provide a down-converted analog signal to the ADC 210 for analog-to-digital conversion and subsequent forwarding by the ADC 210 to the communication processor 124 as a digital signal.

By operating on a received signal "after" the ADC 210 has converted the signal from analog to digital form, the communication processor 124 can analyze the received signal post frequency down-conversion (e.g., "after" at least one mixer circuit 208 operates on the received signal) and post analog-to-digital conversion (e.g., "after" the ADC 210 operates on the received signal). The jammer detector 130-1 or 130-2 may operate on a preprocessed signal. The preprocessed signal may be, for instance, an analog signal that is pre-frequency down-conversion by a mixer, such as the mixer 208 of the transceiver 126 or another mixer (not shown) of the RF front-end 128.

As part of an example signal-transmitting operation, the DAC 260 converts a digital signal received from the communication processor 124 to an analog signal. The DAC 260 forwards the analog signal to the mixer circuit 258, and the mixer circuit 258 accepts the analog signal from the DAC 260. The mixer circuit 258 accepts the analog signal at a BBF or an IF directly or indirectly from the DAC 260. The mixer circuit 258 upconverts the analog signal to a higher frequency, such as to an IF or an RF, to produce a higher-frequency signal using a signal generated by the local oscillator 230 to have a target synthesized frequency.

The mixer circuit 258 provides the RF or other upconverted signal to the filter circuit 256. The filter circuit 256 filters the upconverted IF or RF signal and provides a filtered signal to the power amplifier 254. Thus, after the filtering by the filter circuit 256, the power amplifier 254 amplifies the filtered signal and provides an amplified signal to the signal propagation path 222 for signal conditioning. After further frequency up-conversion if appropriate (e.g., from IF to RF), the RF front-end 128 can provide an RF signal to the antenna 122 for emanation as a wireless signal 220.

Example implementations of a jammer detector 130, as described herein, may be deployed to precede or to follow (from a signal propagation perspective) one or more low-noise amplifiers of the transceiver 126 or the RF front-end 128. Thus, a jammer detector 130 may be coupled to, for instance, an input terminal or an output terminal of a low-noise amplifier 204 or another amplifier. Further, one or more jammer detectors can be deployed in the following manners or situations: in alternative locations along a transmit chain 252 or a receive chain 202, as part of an RF front-end 128, with or without being coupled to an input or an output of an LNA, in a discrete or integrated form, in other portions of an electronic device, and so forth.

The circuitry 200 depicts just a few examples for a transceiver 126 and an RF front-end 128. In some cases, the various components that are illustrated in the drawings using separate schematic blocks or circuit elements may be manufactured or packaged in different discrete manners. For example, one physical module may include components of the RF front-end 128 and some components of the transceiver 126, and another physical module may combine the communication processor 124 with the "remaining" components of the transceiver 126.

Further, in some cases, the antenna 122 may be co-packaged into a module with at least some components of the RF front-end 128 or the transceiver 126. For instance, in a non-limiting example corresponding to a mmW implementation, the transceiver 126 may provide an IF signal to the RF front-end 128. In some of such cases, the RF front-end 128 may be co-packaged into a module with an antenna array version of the antenna 122. Here, the RF front-end 128 includes one or more mixer circuits that are configured to upconvert and down-convert between the IF/RF signals. The RF front-end 128 can also provide further signal conditioning, such as phase shifting and the like for beamforming. In another non-limiting example, such as for a 5G New Radio (NR) Frequency Range 1 (FR1) implementation, the RF front-end 128 may not include a mixer (e.g., with a direct-conversion architecture in which frequency translation between BB and RF occurs in the transceiver 126). Even without a mixer, the RF front-end 128 may nonetheless include other components, such as a power amplifier, a low-noise amplifier, a filter, a jammer detector 130, or other conditioning circuitry for processing after or before (for transmission or reception operations, respectively) the signal is processed by the transceiver 126.

In alternative implementations, one or more components may be physically or logically "shifted" to a different part of the wireless interface device 120 as compared to the illustrated circuitry 200 and/or may be incorporated into a different module. For example, a low-noise amplifier 204 or a power amplifier 254 may alternatively or additionally be deployed in the RF front-end 128. Similarly, an ADC 210 or a DAC 260 may alternatively be deployed in the communication processor 124. Further, a receive chain or a transmit chain may be present in the RF front-end 128, and/or the depicted receive chain 202 or transmit chain 252 may be extended into the RF front-end 128 such that the chain(s) are at least partially distributed across the transceiver 126 and the RF front-end 128.

Figure 3:
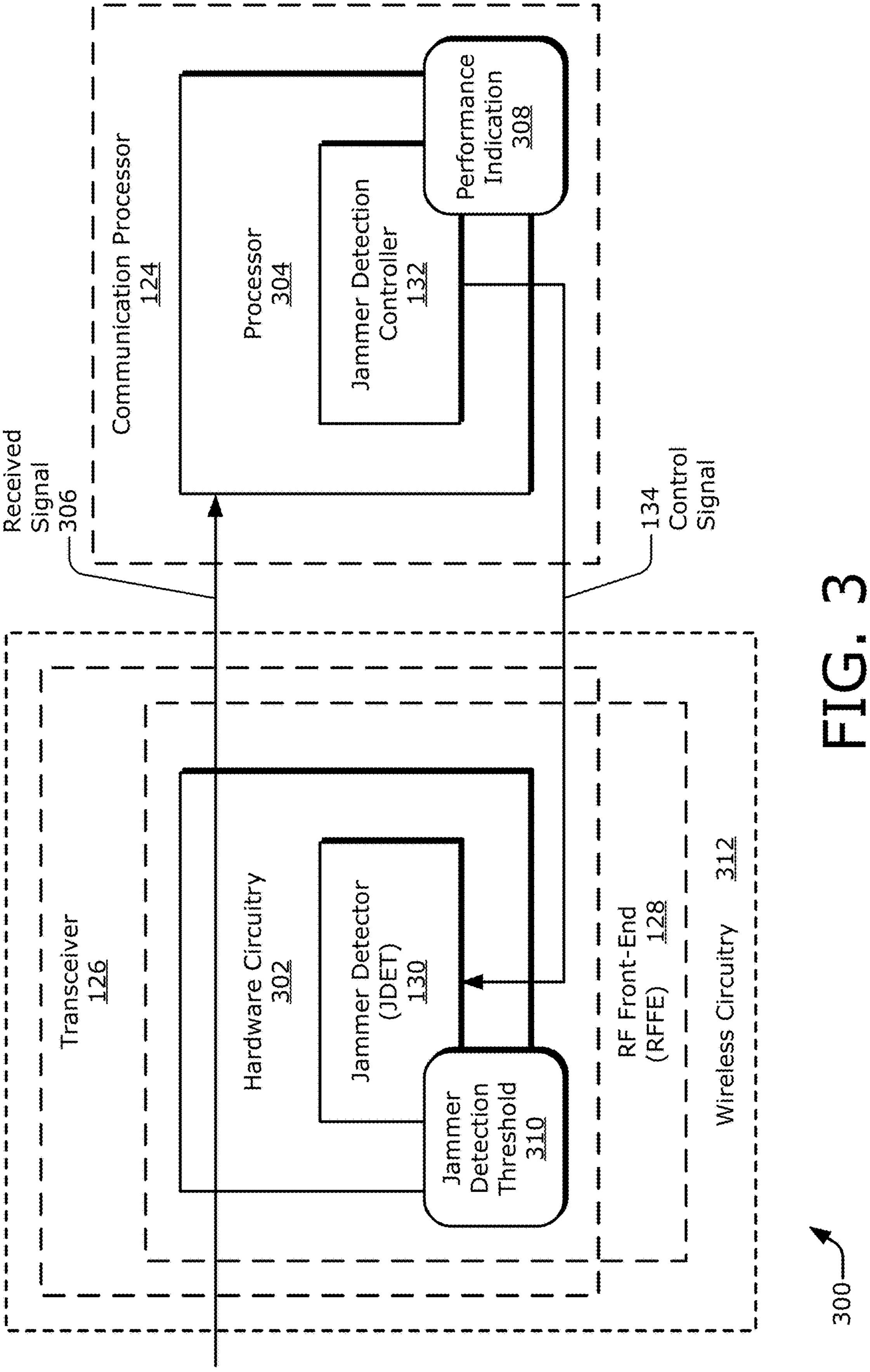
FIG. 3 is a schematic diagram illustrating an example jammer detector and an example jammer detection controller.

FIG. 3 is a schematic diagram 300 illustrating an example jammer detector 130 (JDET 130) and an example jammer detection controller 132. As illustrated, the schematic diagram 300 includes at least one jammer detector 130, at least one jammer detection controller 132, hardware circuitry 302, and at least one processor 304. The schematic diagram 300 also depicts at least one control signal 134, at least one received signal 306, at least one performance indication 308, and at least one jammer detection threshold 310. As an overlay that is described below, FIG. 3 further depicts at least one communication processor 124, at least one transceiver 126, and at least one RF front-end 128. The received signal 306 can propagate through at least a portion of the RF front-end 128 or the transceiver 126, including through parts of each, to reach the at least one processor 304.

In example implementations, the processor 304 can instantiate, execute, or otherwise realize the jammer detection controller 132. In operation, the processor 304 can determine a performance indication 308 corresponding to the received signal 306. By way of example only, the performance indication 308 can include a signal-to-noise ratio (SNR) of the received signal 306. In some cases, the SNR can be based on noise estimates or deltas thereof that are averaged over time using multiple samples. The processor 304 can also adjust a jammer detection threshold 310 based on the performance indication 308 to produce an adjusted jammer detection threshold 310. The jammer detection controller 132 may use the control signal 134 to communicate the adjusted jammer detection threshold 310 to the jammer detector 130.

Thus, the jammer detector 130 may attempt to detect jamming signals based on different jammer detection thresholds, which attempts using different jammer detection thresholds may be performed at different times. The jammer detector 130 can be constructed, incorporated, or otherwise realized using the hardware circuitry 302. At a first time, the jammer detector 130 can detect a first jamming signal based on the jammer detection threshold 310. At a second (e.g., subsequent) time, the jammer detector 130 can detect a second jamming signal based on the adjusted jammer detection threshold 130 that the jammer detection controller 132 determines based on the performance indication 308.

In example aspects, the at least one processor 304 can form at least part of at least one communication processor 124. If the jammer detector 130 forms at least part of the hardware circuitry 302, the jammer detector 130 can operate faster than the jammer detection controller 132. The jammer detection controller 132, however, can analyze the received signal 306 at a higher level, with more intelligence, or using samples of the signal that are obtained over longer periods of time.

In some aspects, the communication processor 124 may be implemented as a modem or baseband processor. The hardware circuitry 302 may be at least part of a transceiver 126 for wireless signals (e.g., a wireless transceiver or wireless receiver), at least part of a radio-frequency front-end 128, or some combination thereof. In other aspects, an apparatus 102 (e.g., of FIG. 1) can include wireless circuitry 312 that is coupled to the communication processor 124. The wireless circuitry 312 may include at least a portion of the transceiver 126, at least a portion of the radio-frequency front-end 128, or some combination thereof. Thus, although the wireless circuitry 312 is depicted in FIG. 3 as including "all" of the rectangles representing the transceiver 126 and the radio-frequency front-end 128, the wireless circuitry 312 may instead include less than all of either or both. For instance, the wireless circuitry 312 may include the radio-frequency front-end 128 and only a portion of the transceiver 126. In certain cases, wireless circuitry 312 that operates on a received signal "before" (from a signal propagation or processing/conditioning perspective) the received signal "reaches" the communication processor 124 may be termed preprocessing wireless circuitry 312.

In some cases, two or more components may be disposed on different integrated circuit chips (not separately represented in FIG. 3). For example, at least one first integrated circuit chip can include at least one communication processor 124, and at least one second integrated circuit chip, which may be coupled to the first integrated circuit chip, can include the wireless circuitry 312. Thus, the operations performed by the jammer detector 130 may be performed by hardware circuitry 302 on the second integrated circuit chip, and the operations performed by the jammer detection controller 132 may be performed by at least one processor 304 on the first integrated circuit chip.

Figure 4:
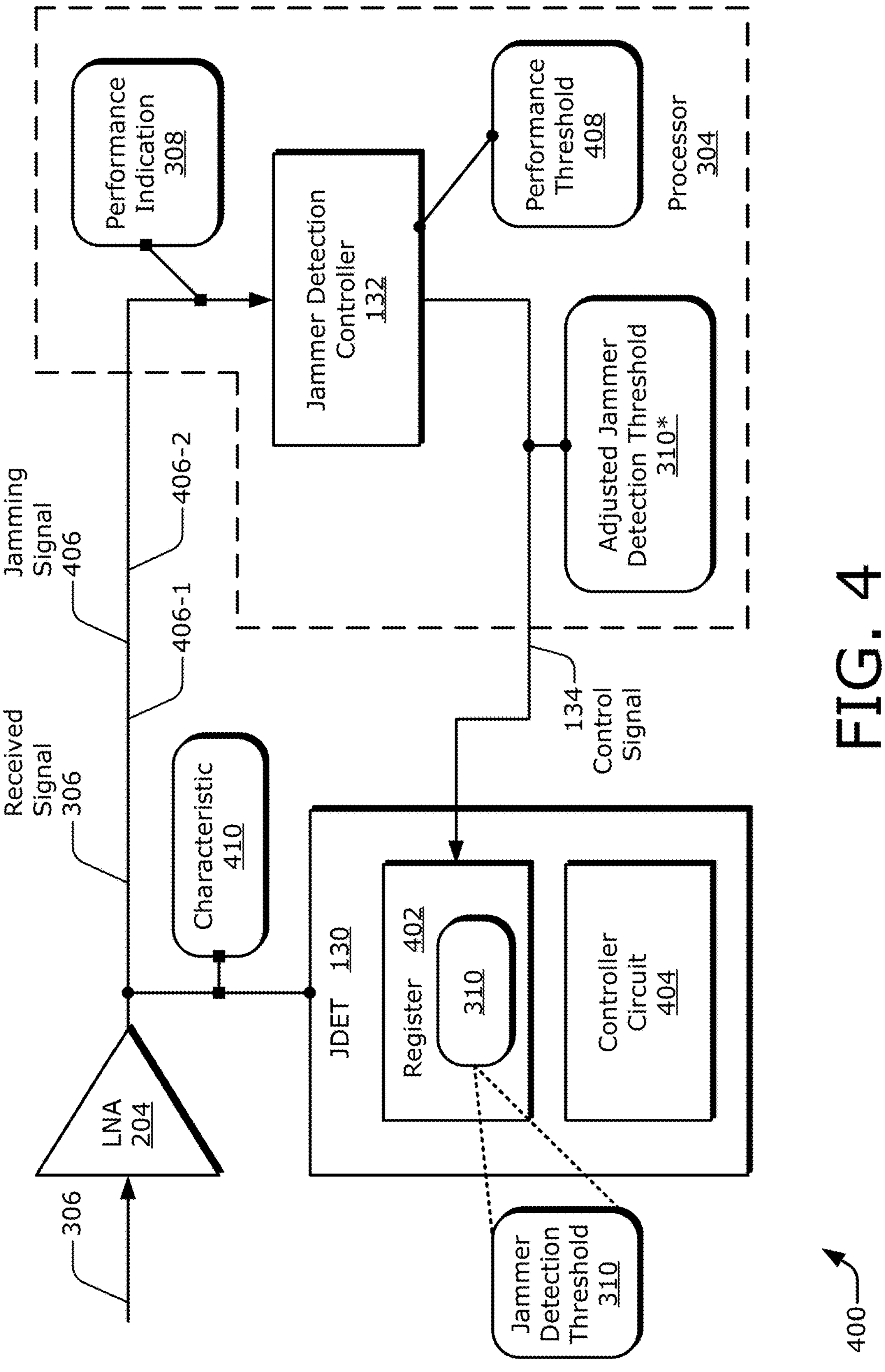
FIG. 4 is a schematic diagram illustrating example operational schemes for adaptive jammer detection with an example jammer detector and an example jammer detection controller.

FIG. 4 is a schematic diagram 400 illustrating example operational schemes for adaptive jammer detection with an example jammer detector 130 (JDET 130) and an example jammer detection controller 132. As illustrated, in addition to the jammer detector 130 and the jammer detection controller 132, the schematic diagram 400 includes at least one low-noise amplifier 204, at least one processor 304, at least one received signal 306, and at least one jamming signal 406. In FIG. 4, the jammer detector 130 is depicted, by way of example only, as having at least one register 402 and at least one controller circuit 404.

Accordingly, in example implementations, the jammer detector 130 includes at least one register 402 and a controller circuit 404 that is coupled to the at least one register 402. The register 402 can store the jammer detection threshold 310. In operation, the controller circuit 404 performs a comparison including a characteristic 410 of the received signal 306 and the jammer detection threshold 310 using the register 402. The controller circuit 404 can detect a first jamming signal 406-1 based on the comparison. For instance, the jammer detector 130 can detect the first jamming signal 406-1 responsive to the characteristic 410 being greater than the jammer detection threshold 310 stored in the register 402.

In additional example operations, the processor 304, as part of implementing the jammer detection controller 132, can perform a comparison including the performance indication 308 corresponding to the received signal 306 and a performance threshold 408. Based on the comparison by the processor 304, the jammer detection controller 132 can determine to adjust the jammer detection threshold 310 to produce an adjusted jammer detection threshold 310*. If an adjusted jammer detection threshold 310* is produced, the processor 304 can load the adjusted jammer detection threshold 310* into the register 402 using the control signal 134.

In some cases, the processor 304 can determine to decrease the jammer detection threshold 310 to produce a decreased jammer detection threshold based on the performance indication 308 corresponding to the received signal 306 being greater than the performance threshold 408. For instance, if the SNR of the received signal 306 is greater than a threshold SNR, the jammer detection threshold 310 can be reduced. This may enable the jammer detector 130 to trigger responsive to jamming signals having lower levels of the characteristic 410. In other situations, the jammer detection controller 132 can increase the jammer detection threshold 310 based on the performance indication 308 and the performance threshold 408. This may reduce the likelihood or frequency that a jammer countermeasure is activated unnecessarily.

As reflected in the schematic diagram 400, the received signal 306 may include a jamming signal 406 in addition to (or instead of) a desired signal. To facilitate detection of the jamming signal 406, at least one characteristic 410 of the received signal 306 can be obtained. By way of example, the characteristic 410 of the received signal 306 can include a power of the received signal 306. To obtain the power, the apparatus generally or the jammer detector 130 specifically may employ a power detector, such as a directional coupler. If the characteristic 410 relates to power, the jammer detection threshold 310 may include at least one value corresponding to decibels.

With reference also to FIG. 2, an apparatus can include an amplifier, such as a low-noise amplifier 204 (LNA 204), that is coupled to the jammer detector 130. The jammer detector 130 may be coupled to an input or an output of the low-noise amplifier 204 (or another amplifier) along a receive chain 202. In some aspects, the processor 304 can adjust the jammer detection threshold 310 based on a saturation level of the low-noise amplifier 204 or that of another amplifier. Examples of such implementations are described below with reference to FIGS. 6-9.

The jammer detector 130 can be empowered to counteract the actual or potential effects of a jamming signal 406. To do so, the jammer detector 130 can perform or activate a countermeasure responsive to detection of a jamming signal 406, such as a first jamming signal 406-1 or a second jamming signal 406-2. The jammer detector 130 can, for instance, activate at least one filter to perform a countermeasure responsive to the detection of the jamming signal 406. The filter that is switched into a signal propagation path (or subsequently out of the signal propagation path) may correspond to a filter that is coupled to the input or the output of the low-noise amplifier 204, such as the filter circuit 206 of FIG. 2. In some cases, a countermeasure filter may include at least one microacoustic filter, such as a bulk acoustic wave (BAW) filter or a surface acoustic wave (SAW) filter. In certain implementations, a communication processor 124 (e.g., of FIGS. 1-3), or a jammer detection controller 132 thereof, can determine the performance indication 308 over a first time period. The jammer detector 130 can detect at least one jamming signal 406 over a second time period, with the second time period being shorter than the first time period. The time periods may differ by an order of magnitude and/or may overlap in time.

Figure 5:
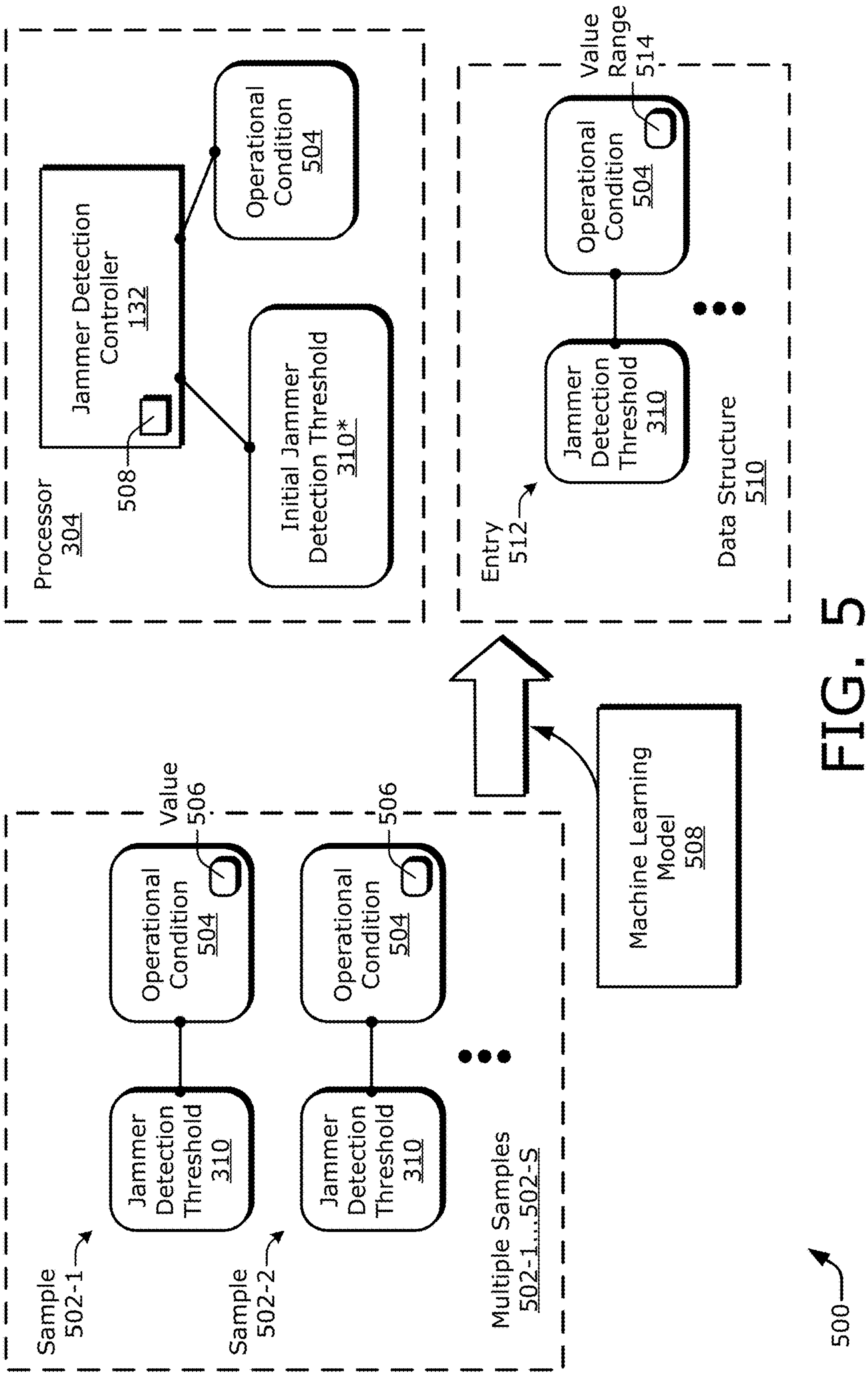
FIG. 5 is a schematic diagram illustrating example techniques for initializing a jammer detection threshold based on historical information.

FIG. 5 is a schematic diagram 500 illustrating example techniques for initializing a jammer detection threshold 310 based on historical information. As illustrated, the processor 304 can include (e.g., realize, such as execute) a jammer detection controller 132. The jammer detection controller 132 can include, operate, or control at least one machine learning model 508. Generally, the jammer detection controller 132 can establish an initial jammer detection threshold 310* based on one or more operational conditions 504. By starting a search for a current jammer detection threshold 310 with an initial jammer detection threshold 310* that is based on historical information, the search can be shortened, or a period during which a connection is sub-optimal can be reduced.

An operational condition 504 can be any environmental parameter or usage attribute that may affect the receipt or processing of a wireless signal. For example, operational conditions 504 can include a location of an apparatus (e.g., geospatial coordinates or cell identifier), a handsfree status (e.g., whether Bluetooth® is being used), a radio usage status (e.g., which radios are turned on or are currently transmitting or receiving, such as a Wi-Fi® radio), a wired connectivity status (e.g., whether a cable is connected to a USB interface), a transmit power (e.g., for a same or a different wireless technology or channel), combinations thereof, and so forth.

In example implementations, historical information about determined jammer detection thresholds 310 can be obtained and retained. For example, multiple samples 502-1 . . . 502-S, with "S" representing a positive integer, can be stored. Each sample 502, such as a first sample 502-1 or a second sample 502-2, can correspond to a respective determined instance of a jammer detection threshold 310 or a set of one or more operational conditions 504. For example, each sample 502 can include a jammer detection threshold 310 that is associated with the one or more operational conditions 504 that are present, extant, or otherwise relevant to the environment or usage with respect to determining the respective jammer detection threshold 310.

Each operational condition 504 can include (e.g., have, indicate, or be linked to) at least one value 506. For example, a handsfree-status operational condition 504 can be a Boolean affirmative or negative value 506. A transmit-power operational condition 504 can include a numeric value 506 representing the power in decibels. A radio-usage-status operational condition 504 can include a value 504 with a list of one or more radios that were operative while the associated jammer detection threshold 310 was determined previously. A given sample 502 may include at least one value 506 for fewer than all operational conditions 504 that a system tracks. Further, different samples 502 may have values 506 for different sets (e.g., quantities or selections) of the available operational conditions 504.

Accordingly, in some implementations, the at least one processor 304 can store multiple samples 502-1 . . . 502-S, with each sample 502 associating a respective jammer detection threshold 310 with at least one value 506 for at least a portion of the one or more operational conditions 504. The at least one processor 304 can employ, for instance, unsupervised machine learning to the multiple samples 502-1 . . . 502-S to bin the multiple samples into categorical ranges of the one or more operational conditions 504. Thus, the at least one processor 304 can apply a machine learning model 508 to the multiple samples 502-1 . . . 502-S to determine categories that correspond to ranges of the operational conditions 504.

The ranges can pertain to a numerical range, such as for power or geographic location. Additionally or alternatively, the ranges can pertain to combinations of values 506 of the various operational conditions 504. For instance, one bin may relate to having a USB cable plugged in while running a Wi-Fi® radio, and another bin may relate to a particular X-decibel ("X" dB) power range in conjunction with using a handsfree device.

In some cases, the at least one processor 304 can therefore use at least one machine learning algorithm to determine the initial jammer detection threshold 310* and load the initial jammer detection threshold 310* into at least one register 402 that is associated with a jammer detector 130 (e.g., each of FIG. 4). The search or tuning for a superior, if not fully optimal, jammer detection threshold 310 can then start from an initial jammer detection threshold 310* that is likely to be closer to the tuned threshold as compared to starting with a minimum or maximum jammer detection threshold 310.

In example implementations, the historical information covering determined jammer detection thresholds and associated operational conditions can be used by the at least one processor 304 or the jammer detection controller 132 to produce a data structure 510. As shown in FIG. 5, the data structure 510 can include multiple entries, such as an entry 512. The entry 512 includes at least one jammer detection threshold 310 that is associated with one or more operational conditions 504. Each operational condition 504 can include or correspond to a value range 514 that pertains to the associated jammer detection threshold 310, at least in conjunction with the other value ranges 514 of the other operational conditions 504 of the given entry 512. The data structure 510 can be computed, generated, or otherwise produced using artificial intelligence, including machine learning, or using one or more other mechanisms, such as statistical analysis. Each entry 512, or a set of entries, may be considered a respective bin or category.

Given such a data structure 510, the at least one processor 304 can access the multiple entries to ascertain an initial jammer detection threshold 310*, with each entry 512 respectively associated with at least one value (e.g., a value range 514) for at least a portion of the one or more operational conditions 504 that are being monitored, recorded, or analyzed. If the data structure 510 is generated using at least one artificial intelligence technique, the at least one processor 304 can include at least a portion of an artificial intelligence (AI) engine. The AI engine may be part of, for example, a communication processor 124, an application processor 108 (e.g., of FIG. 1), an SoC, and so forth.

As described herein, a jammer detection threshold 310 can be adjusted based on a quality of a connection as reflected by at least one performance indication 308. A performance indication 308 (e.g., a key performance indicator (KPI), such as SNR) can experience degradation responsive to an amplifier, such as the low-noise amplifier 204 (e.g., of FIGS. 2 and 4), becoming saturated. FIGS. 6-9 are described next in the context of the low-noise amplifier 204 becoming saturated, but the principles apply to amplifiers generally. Amplifier saturation may be defined in different manners. In some cases, an amplifier may be deemed to be saturated in terms of a reduction in maximum gain. For instance, a certain number of decibels below a maximum specified gain may be designated to be a saturation state. Although a 1-dB gain compression point (e.g., P1dB) may be used to determine that an amplifier is at a saturation level, other gain compression points or other saturation definitions may be used instead.

Figure 6:
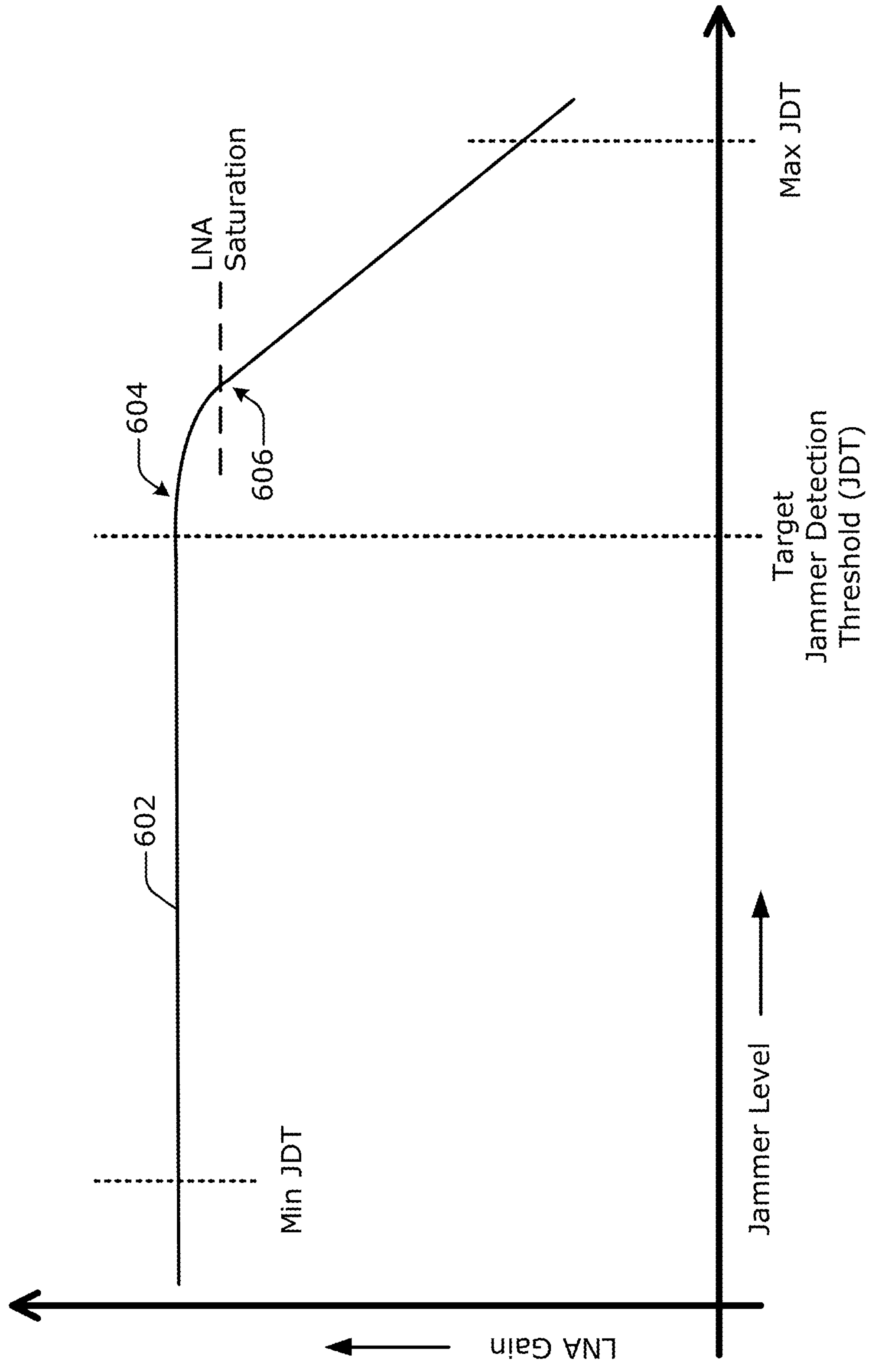
FIG. 6 is a graph illustrating an example relationship between a jammer level and a gain of a low-noise amplifier (LNA), including an indication of an example saturation level.

FIG. 6 is a graph 600 illustrating an example relationship between a jammer level and a gain of a low-noise amplifier (LNA), including an indication of an example saturation level. As shown, the jammer level is depicted along the abscissa axis (e.g., the horizontal or x-axis), and the LNA gain is depicted along the ordinate axis (e.g., the vertical or y-axis). A curve 602 illustrates an example LNA gain versus jammer level, but the principles are applicable to other such relationships. Example jammer detection thresholds (JDTs) are indicated with three vertical short-dashed lines. These include a minimum jammer detection threshold (JDT) (Min JDT), a maximum JDT (Max JDT), and a target JDT. An example LNA saturation level is indicated by a horizontal long-dashed line.

In example implementations, as a jammer power level exceeds the target JDT, the LNA gain begins to decrease as shown at 604. After some decreased LNA gain, the LNA saturation level is reached at 606. With the depicted example target JDT, jammers below the LNA saturation level can be ignored because such jammers likely do not appreciably affect the connection quality. On the other hand, for jammers having a power that is greater than the target JDT, a jammer detector 130 can be set to detect such jammers, which likely do affect connection quality adversely. In response to a jamming-signal detection, the jammer detector 130 can also enact at least one countermeasure, such as activation of at least one filter to potentially attenuate the jamming signal.

To determine a target JDT for storing in a register 402 as the jammer detection threshold 310, multiple algorithms may be used. For example, the process may start with a maximum JDT and decrease the JDT until the LNA exits saturation and detects at least one jamming signal. Alternatively, the process may start with a minimum JDT and increase the JDT with each jammer detection until the LNA enters saturation. The process may then reduce the JDT below the saturation level to the previous level that detected a jamming signal.

Figure 7:
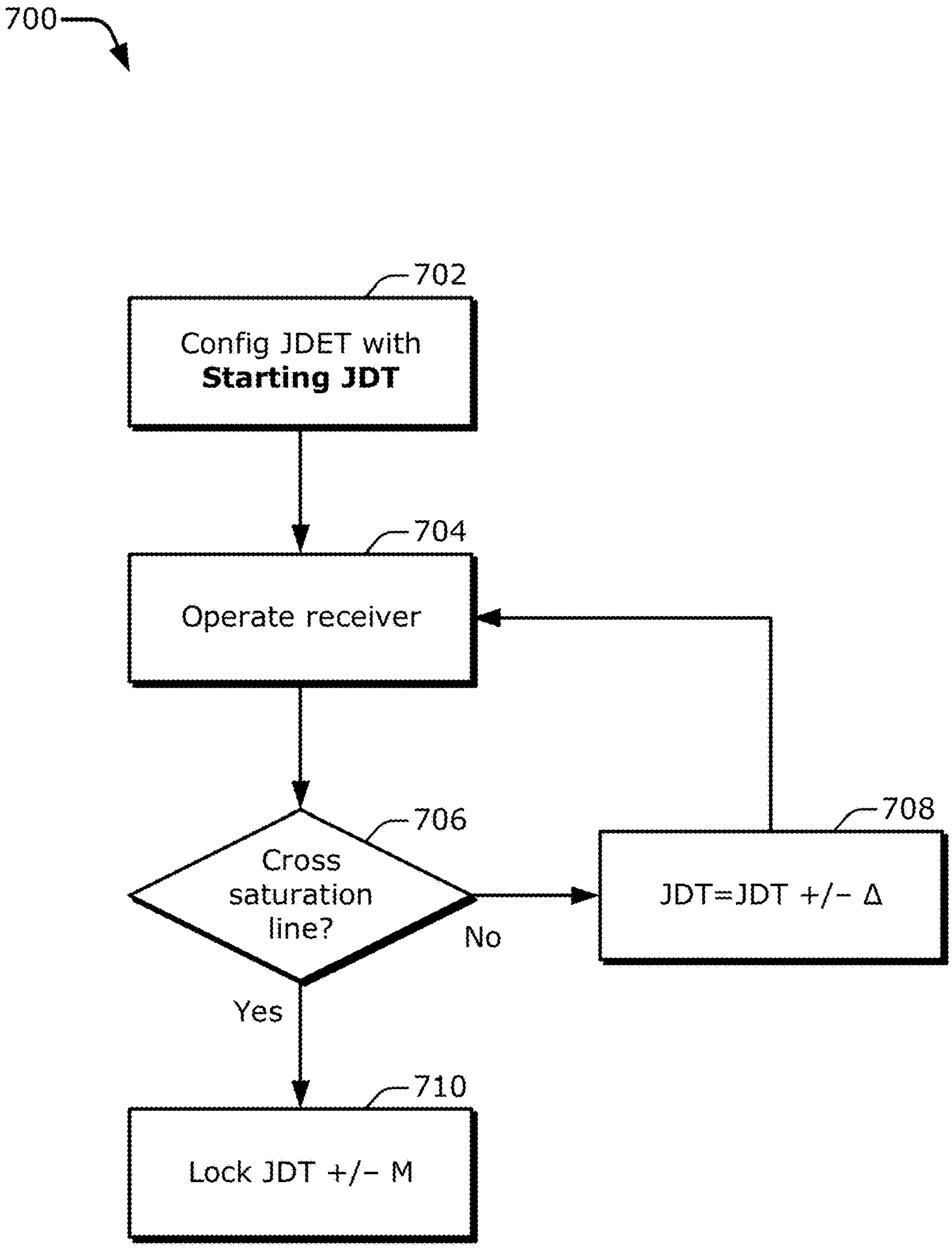
FIG. 7 is a flow chart illustrating example processes for determining a jammer detection threshold based on saturation level.

FIG. 7 is a flow chart illustrating example processes for determining a jammer detection threshold based on saturation level. The process 700 includes five blocks 702-710 that specify operations that can be performed for a method. At 702, the jammer detection configuration process is begun with a starting jammer detection threshold (Starting JDT). The starting jammer detection threshold may be a maximum jammer detection threshold (e.g., as described further with reference to FIG. 8), a minimum jammer detection threshold (e.g., as described further with reference to FIG. 9), an initial or stored jammer detection threshold based on historical information, a random jammer detection threshold, a most-recently-used jammer detection threshold, and so forth. At 704, the receiver is operated by receiving wireless signals. For example, the jammer detector 130 can attempt to detect a jamming signal 406 in a received signal 306, and the jammer detection controller 132 can monitor an amplifier for a saturation state.

Figure 8:
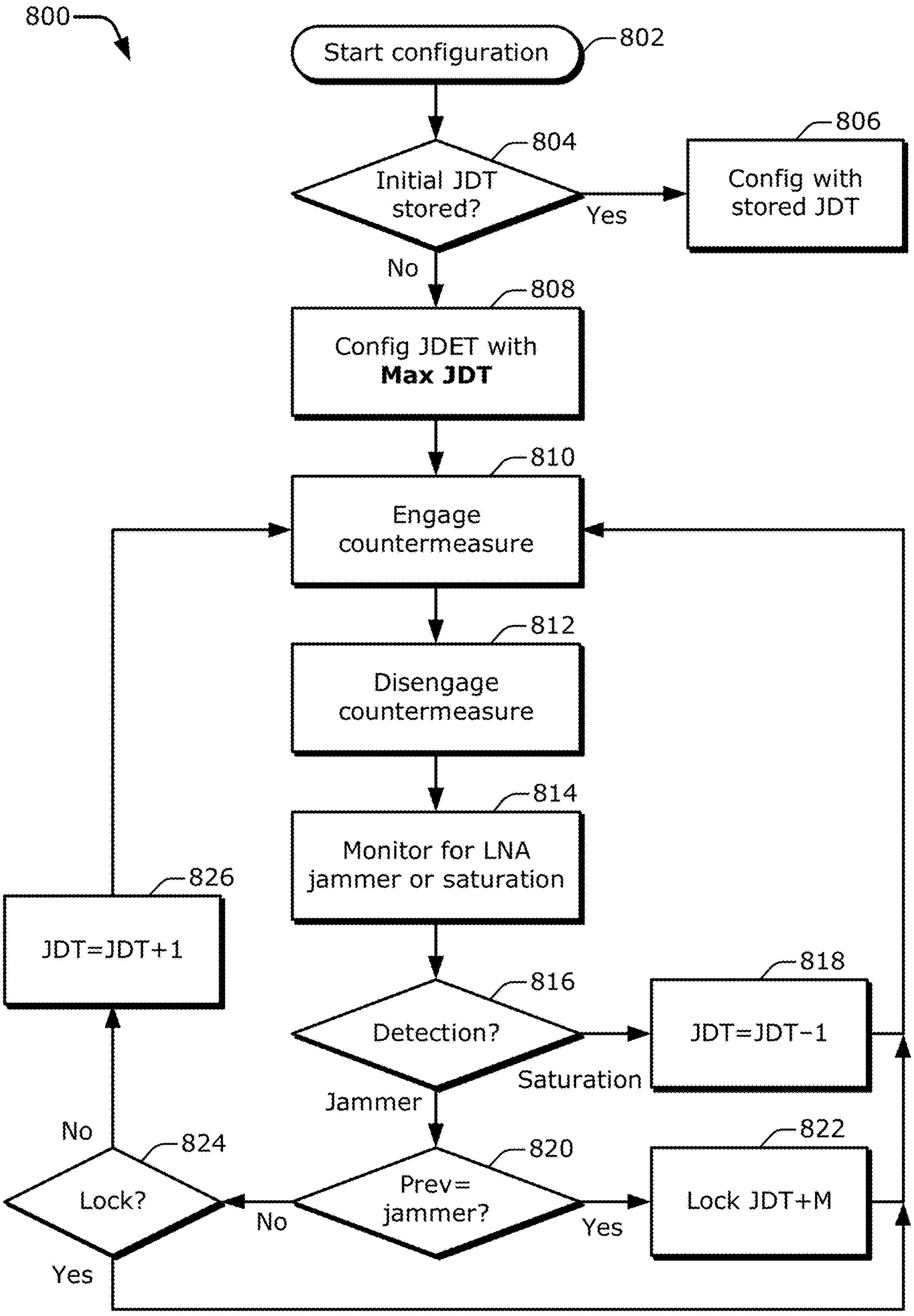
FIG. 8 is a flow chart illustrating example processes for determining a jammer detection threshold after starting from a maximum jammer detection threshold.
Figure 9:
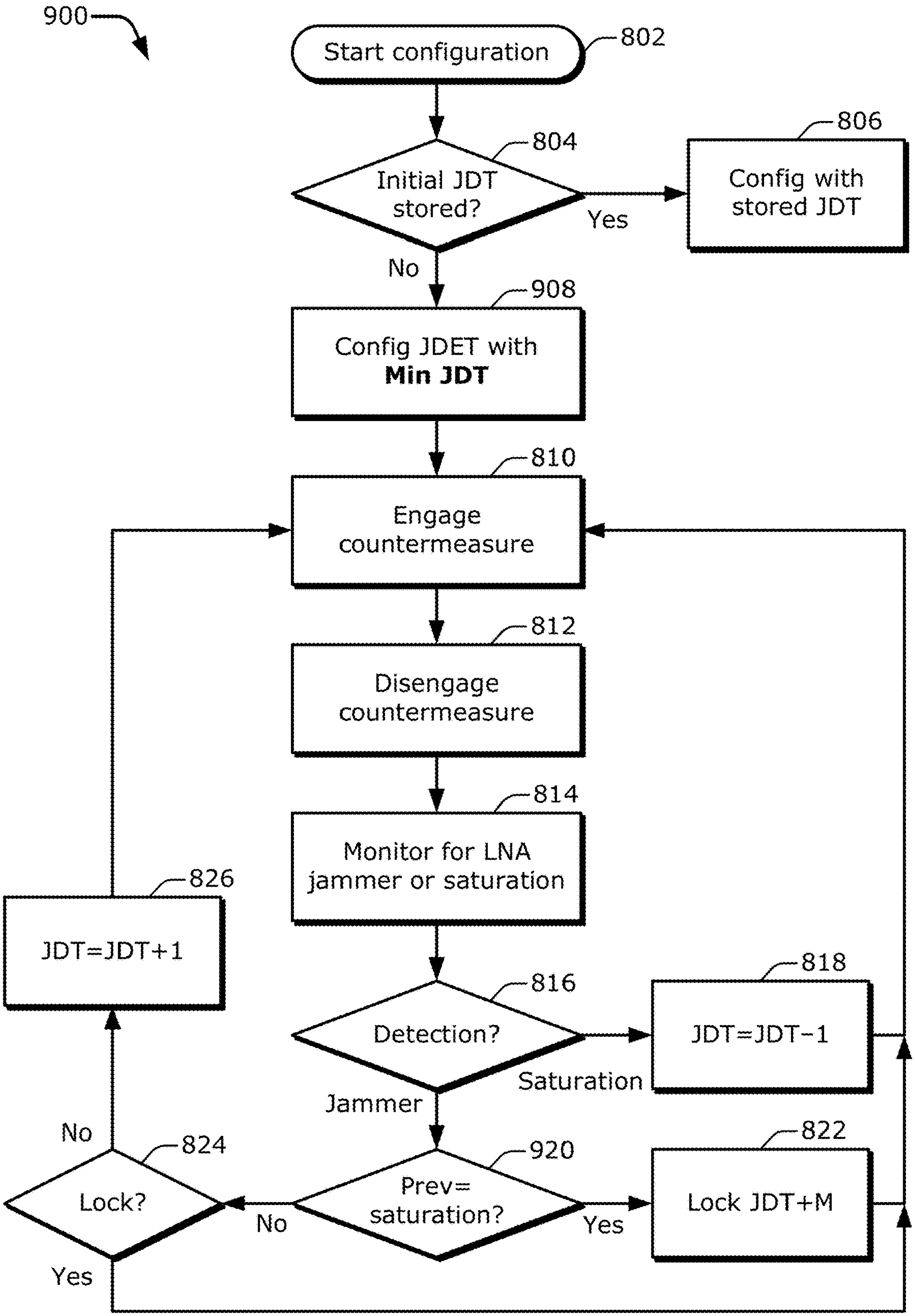
FIG. 9 is a flow chart illustrating example processes for determining a jammer detection threshold after starting from a minimum jammer detection threshold.

At 706, the system determines if the amplifier operation has crossed a saturation line. For example, the jammer detection controller 132 can determine if a gain of an LNA 204 has crossed a selected saturation line 606. If not, then at block 708 the jammer detection controller 132 adjusts the jammer detection threshold by some amount "delta." The adjustment can be a decrease or an increase to the jammer detection threshold, depending on, for instance, if the starting jammer detection threshold is set relatively high (e.g., as shown in FIG. 8) or relatively low (e.g., as shown in FIG. 9). Responsive to the jammer detection threshold adjustment at 708, the process continues at 704 with further receiver operation. On the other hand, if the selected saturation line has been crossed (as determined at 706), then at 710 the jammer detection controller 132 locks the jammer detection threshold for continuing use. The locked jammer detection threshold may be tuned with a margin "M" to account for hysteresis effects or for reaching the target jammer detection threshold from a particular direction, as is described herein with reference to FIGS. 6, 8, and 9. A method for establishing a jammer detection threshold may be performed in manners that differ from those of the process 700.

FIG. 8 is a flow chart illustrating example processes 800 for determining a jammer detection threshold after starting from a maximum jammer detection threshold (Max JDT). The process 800 includes 13 blocks 802-826 that specify operations that can be performed for a method. At 802, the configuration process is started. At 804, it is determined if an initial jammer detection threshold is stored or otherwise obtainable e.g., by analyzing historical information or applying a machine learning model. If so, then at 806 the jammer detector is configured with the stored jammer detection threshold as an initial value. If not, then at 808 the jammer detector is configured with a maximum jammer detection threshold (Max JDT).

At least the receiver and the jammer detector can then be run at 810 with a countermeasure (e.g., at least one filter) being engaged. At 812, the countermeasure is disengaged (e.g., the filter is switched out of the receive chain path), and the receiver and the jammer detector are operated again. At 814, the LNA is monitored for amplifying a jamming signal or entering a saturation level. At 816, it is determined if a jammer or a saturation level is detected. If saturation is detected, then at 818 the jammer detection threshold is decreased, such as by one unit (e.g., JDT=JDT−1). After operation 818, the process flow returns to block 810.

On the other hand, if a jammer is detected at 816, then the process 800 proceeds to operation 820. At 820, it is determined if the previous detection at 816 was for a jammer. If so, then at 822 the current jammer detection threshold is locked, optionally with a margin "M" added to handle hysteresis and prevent toggling. After operation 822, the process flow returns to block 810.

If, on the other hand, the previous detection was not determined to be a jammer at 820, the process continues at 824. At 824, the system determines if a jammer detection threshold has already been locked. If yes, then the process flow returns to block 810. If no, then at block 826 the jammer detection threshold can be increased, such as by one unit (e.g., JDT=JDT+1). After operation 826, the process flow returns to block 810.

FIG. 9 is a flow chart illustrating example processes 900 for determining a jammer detection threshold after starting from a minimum jammer detection threshold (Min JDT). The process 900 includes 13 blocks 802-806, 908, 810-818, 920, and 822-826 that specify operations that can be performed for a method. The process 900 is similar to the process 800 of FIG. 8. However, absent an initial jammer detection threshold, the process starts with the jammer detector being configured with a minimum jammer detection threshold (Min JDT) at 908.

Further, the process 900 likely first follows the "jammer detection" path from 816 to block 920 due to starting with the minimum jammer detection threshold. At 920, the system determines if the previous detection was for a "saturation level." If not (e.g., the previous detection was for a "jammer" at 816), then the process 900 continues to block 826 via the "no" branch from block 824. At 826, the jammer detection threshold can be increased, such as by one unit (e.g., JDT=JDT+1). After operation 826, the process flow returns to block 810.

Figure 10:
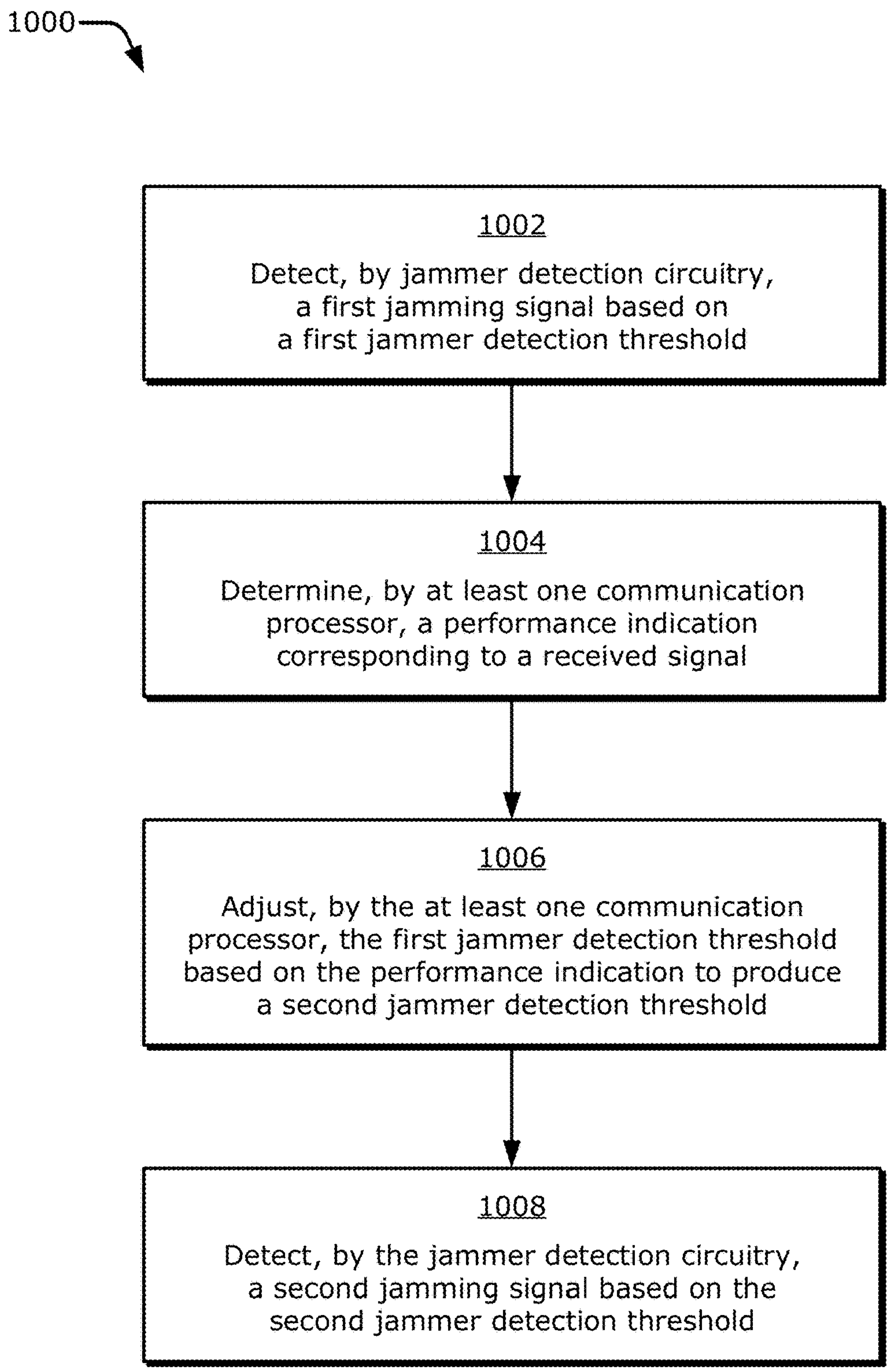
FIG. 10 is a flow diagram illustrating an example process for operating an adaptive jammer detector or adaptively detecting jammer signals responsive to at least one signal performance indication.

FIG. 10 is a flow diagram illustrating an example process 1000 for operating an adaptive jammer detector or adaptively detecting jammer signals responsive to at least one current performance indication. The process 1000 includes four blocks 1002-1008 that specify operations that can be performed for a method. In example implementations, operations represented by the illustrated blocks of each process may be performed by an electronic device, such as the electronic device 102 of FIG. 1 or the wireless interface device 120 thereof. More specifically, the operations of the respective processes may be performed by a jammer detector 130 of a transceiver 126 or an RF front-end 128 or by a jammer detection controller 132 of a processor, such as a communication processor 124.

At block 1002, jammer detection circuitry detects a first jamming signal based on a first jammer detection threshold. For example, a jammer detector 130 can detect a first jamming signal 406-1 based on a first jammer detection threshold 310. The jammer detector 130 may, for instance, detect the first jamming signal 406-1 based on a comparison between the first jammer detection threshold 310 and a characteristic 410 of a received signal 306.

At block 1004, at least one communication processor determines a performance indication corresponding to a received signal. For example, at least one processor 304 can determine a performance indication 308 corresponding to the received signal 306. In some cases, a jammer detection controller 132 of a modem or baseband processor may determine an attribute of the received signal 306 that is better computed over time, such as an SNR.

At block 1006, the at least one communication processor adjusts the first jammer detection threshold based on the performance indication to produce a second jammer detection threshold. For example, the at least one processor 304 can adjust the first jammer detection threshold 310 based on the performance indication 308 to produce a second jammer detection threshold 310* (or adjusted jammer detection threshold 310*). To do so, the jammer detection controller 132 may compare the performance indication 308 to a performance threshold 408. If the performance indication 308 fails to meet (e.g., is greater than) the performance threshold 408, the jammer detection controller 132 may adjust the first jammer detection threshold 310 by decreasing the first jammer detection threshold 310.

At block 1008, the jammer detection circuitry detects a second jamming signal based on the second jammer detection threshold. For example, the jammer detector 130 can detect a second jamming signal 406-2 based on the second jammer detection threshold 310*. Here, the jammer detector 130 may detect the second jamming signal 406-2 because the characteristic 410 of the received signal 306 is greater than the lowered second jammer detection threshold 310*.

The processes 700, 800, 900, and 1000 of FIGS. 7, 8, 9, and 10, respectively, are depicted and described with certain operations in particular orders. However, operations are not necessarily limited to the order shown in the figures or described herein, for the operations may be implemented in alternative orders or in fully or partially overlapping manners. Also, more, fewer, and/or different operations may be implemented to perform a respective process or an alternative process.

IMPLEMENTATION EXAMPLES

This section describes some aspects of example implementations and/or example configurations related to the apparatuses and/or processes presented above.

Example aspect 1: An apparatus comprising:

at least one communication processor configured to:

determine a performance indication corresponding to a received signal; and adjust a jammer detection threshold based on the performance indication to produce an adjusted jammer detection threshold; and wireless circuitry coupled to the at least one communication processor, the wireless circuitry comprising a jammer detector configured to:

detect a first jamming signal based on the jammer detection threshold; and detect a second jamming signal based on the adjusted jammer detection threshold.

Example aspect 2: The apparatus of example aspect 1, wherein:

the wireless circuitry comprises a low-noise amplifier (LNA) coupled to the jammer detector; and the at least one communication processor is configured to adjust the jammer detection threshold based on a saturation level of the low-noise amplifier.

Example aspect 3: The apparatus of example aspect 1 or 2, wherein the performance indication comprises a signal-to-noise ratio (SNR) corresponding to the received signal.

Example aspect 4: The apparatus of any one of the preceding example aspects, wherein:

the at least one communication processor comprises at least part of a modem; and the wireless circuitry comprises preprocessing wireless circuitry.

Example aspect 5: The apparatus of example aspect 4, wherein the preprocessing wireless circuitry comprises at least one of:

at least part of a wireless receiver; or at least part of a radio-frequency front-end.

Example aspect 6: The apparatus of any one of the preceding example aspects, wherein:

the at least one communication processor comprises at least part of a baseband processor; and the wireless circuitry comprises preprocessing wireless circuitry.

Example aspect 7: The apparatus of any one of the preceding example aspects, further comprising:

at least one first integrated circuit chip comprising the at least one communication processor; and at least one second integrated circuit chip coupled to the first integrated circuit chip, the second integrated circuit chip comprising the wireless circuitry.

Example aspect 8: The apparatus of any one of the preceding example aspects, wherein:

the at least one communication processor is configured to determine the performance indication corresponding to the received signal post frequency down-conversion and post analog-to-digital conversion; and the jammer detector is configured to detect the first and second jamming signals using a preprocessed signal.

Example aspect 9: The apparatus of example aspect 8, wherein:

the preprocessed signal comprises an analog signal that is pre-frequency down-conversion by a mixer.

Example aspect 10: The apparatus of any one of the preceding example aspects, wherein:

the at least one communication processor is configured to determine the performance indication over a first time period; and the jammer detector is configured to detect at least one jamming signal over a second time period, the second time period shorter than the first time period.

Example aspect 11: The apparatus of any one of the preceding example aspects, wherein:

the jammer detector comprises:

at least one register configured to store the jammer detection threshold; and a controller circuit coupled to the at least one register; and the controller circuit is configured to:

perform a comparison including a characteristic of the received signal and the jammer detection threshold using the at least one register; and detect the first jamming signal based on the comparison.

Example aspect 12: The apparatus of example aspect 11, wherein the at least one communication processor is configured to:

perform a comparison including the performance indication corresponding to the received signal and a performance threshold;

determine to adjust the jammer detection threshold to produce the adjusted jammer detection threshold based on the comparison by the at least one communication processor; and load the adjusted jammer detection threshold into the at least one register.

Example aspect 13: The apparatus of example aspect 12, wherein the at least one communication processor is configured to:

determine to decrease the jammer detection threshold to produce a decreased jammer detection threshold based on the performance indication corresponding to the received signal being greater than the performance threshold.

Example aspect 14: The apparatus of any one of example aspects 11-13, wherein the characteristic of the received signal comprises a power of the received signal.

Example aspect 15: The apparatus of any one of the preceding example aspects, wherein the jammer detector is configured to:

perform a countermeasure responsive to detection of the first jamming signal.

Example aspect 16: The apparatus of example aspect 15, wherein the jammer detector is configured to:

activate at least one filter to perform the countermeasure responsive to the detection of the first jamming signal.

Example aspect 17: The apparatus of any one of the preceding example aspects, wherein the at least one communication processor is configured to:

establish an initial jammer detection threshold based on one or more operational conditions.

Example aspect 18: The apparatus of example aspect 17, wherein the one or more operational conditions comprise at least one of:

location of the apparatus, handsfree status, radio usage status, wired connectivity status, or transmit power.

Example aspect 19: The apparatus of example aspect 17 or 18, wherein the at least one communication processor is configured to:

access a data structure that includes multiple entries to ascertain the initial jammer detection threshold, each entry respectively associated with at least one value for at least a portion of the one or more operational conditions.

Example aspect 20: The apparatus of any one of the preceding example aspects, wherein the at least one communication processor comprises at least a portion of an artificial intelligence (AI) engine.

Example aspect 21: The apparatus of any one of example aspects 17-20, wherein the at least one communication processor is configured to:

store multiple samples, each sample associating a respective jammer detection threshold with at least one value for at least a portion of the one or more operational conditions; and employ unsupervised machine learning to the multiple samples to bin the multiple samples into categorical ranges of the one or more operational conditions.

Example aspect 22: The apparatus of any one of example aspects 17-21, wherein the at least one communication processor is configured to:

use at least one machine learning algorithm to determine the initial jammer detection threshold; and load the initial jammer detection threshold into at least one register that is associated with the jammer detector, wherein the jammer detection threshold comprises the initial jammer detection threshold.

Example aspect 23: The apparatus of any one of the preceding example aspects, further comprising:

a display screen; and one or more processors operatively coupled to the display screen and at least a portion of the wireless circuitry, the one or more processors configured to present one or more graphical images on the display screen based on one or more wireless signals communicated using the wireless circuitry, the one or more processors comprising the at least one communication processor.

Example aspect 24: An apparatus comprising:

jammer detector circuitry configured to detect jamming signals based on a programmable jammer detection threshold; and means for adjusting the programmable jammer detection threshold based on a performance indication of a received signal.

Example aspect 25: The apparatus of example aspect 24, further comprising:

means for initializing the programmable jammer detection threshold based on multiple jammer detection threshold categories, each jammer detection threshold category associating at least one respective jammer detection threshold with one or more operational conditions.

Example aspect 26: The apparatus of example aspect 25, further comprising:

means for building a machine learning model corresponding to the multiple jammer detection threshold categories based on multiple jammer detection threshold samples, each jammer detection threshold sample associating a respective jammer detection threshold with one or more operational conditions.

Example aspect 27: A method for adaptive jammer detection, the method comprising:

detecting, by jammer detection circuitry, a first jamming signal based on a first jammer detection threshold;

determining, by at least one communication processor, a performance indication corresponding to a received signal;

adjusting, by the at least one communication processor, the first jammer detection threshold based on the performance indication to produce a second jammer detection threshold; and detecting, by the jammer detection circuitry, a second jamming signal based on the second jammer detection threshold.

Example aspect 28: The method of example aspect 27, further comprising:

comparing a performance threshold and the performance indication corresponding to the received signal;

determining to adjust the first jammer detection threshold to produce the second jammer detection threshold based on the comparing; and loading at least one register with the second jammer detection threshold based on the determining to adjust the first jammer detection threshold.

Example aspect 29: The method of example aspect 27 or 28, further comprising:

initializing the first jammer detection threshold using a machine learning model that ascertains relationships between jammer detection thresholds and one or more operational conditions.

Example aspect 30: An apparatus comprising:

jammer detector circuitry configured to detect jamming signals based on a programmable jammer detection threshold; and a jammer detection controller configured to initialize the programmable jammer detection threshold based on relationships between jammer detection thresholds and one or more operational conditions.

Example aspect 31: The apparatus of example aspect 30, wherein the jammer detection controller is configured to:

initialize the programmable jammer detection threshold using an unsupervised machine learning model that bins the relationships between the jammer detection thresholds and the one or more operational conditions.

Example aspect 32: The apparatus of example aspect 31, wherein the jammer detection controller is configured to:

store multiple samples, each sample including a respective jammer detection threshold associated with at least one value for at least a portion of the one or more operational conditions; and bin the multiple samples into categorical ranges of the one or more operational conditions.

CONCLUSION

As used herein, the terms "couple," "coupled," or "coupling" refer to a relationship between two or more components that are in operative communication with each other to implement some feature or realize some capability that is described herein. The coupling can be realized using, for instance, a physical line, such as a metal trace or wire, or an electromagnetic coupling, such as with a transformer. A coupling can include a direct coupling or an indirect coupling. A direct coupling refers to connecting discrete circuit elements via a same node without an intervening element. An indirect coupling refers to connecting discrete circuit elements via one or more other devices or other discrete circuit elements, including two or more different nodes.

The term "node" (e.g., including a "first node" or a "power distribution network node") represents at least a point of electrical connection between two or more components (e.g., circuit elements). Although at times a node may be visually depicted in a drawing as a single point, the node can represent a connection portion of a physical circuit or network that has approximately a same voltage potential at or along the connection portion between two or more components. In other words, a node can represent at least one of multiple points along a conducting medium (e.g., a wire or trace) that exists between electrically connected components. Similarly, a "terminal" or "port" may represent one or more points with at least approximately a same voltage potential relative to an input or output of a component (e.g., a transistor).

The terms "first," "second," "third," and other numeric-related indicators are used herein to identify or distinguish similar or analogous items from one another within a given context—such as a particular implementation, a single drawing figure, a given component, or a claim. Thus, a first item in one context may differ from a first item in another context. For example, an item identified as a "jamming signal" in one context may be identified as a "first jamming signal" in another context. Similarly, a "first jammer detection threshold" or an "adjusted jammer detection threshold" in one claim may be recited as a "third jammer detection threshold" or a "second jammer detection threshold," respectively, in a different claim (e.g., in separate claim sets). An analogous interpretation applies to differential-related terms such as a "plus received signal" and a "minus received signal."

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for adaptive jammer detection have been described in language specific to certain features and/or methods, the subject of the appended claims is not necessarily limited to the specific features or methods described. Rather, the specific features and methods are disclosed as example implementations for adaptive jammer detection.

What is claimed is:

1. An apparatus comprising:

at least one communication processor configured to:

determine a performance indication corresponding to a received signal; and adjust a jammer detection threshold based on the performance indication to produce an adjusted jammer detection threshold; and wireless circuitry coupled to the at least one communication processor, the wireless circuitry comprising a jammer detector configured to:

detect a first jamming signal based on the jammer detection threshold; and detect a second jamming signal based on the adjusted jammer detection threshold, wherein:

the at least one communication processor is configured to determine the performance indication over a first time period; and the jammer detector is configured to detect at least one jamming signal over a second time period, the second time period shorter than the first time period.

2. The apparatus of claim 1, wherein:

the wireless circuitry comprises a low-noise amplifier (LNA) coupled to the jammer detector; and the at least one communication processor is configured to adjust the jammer detection threshold based on a saturation level of the low-noise amplifier.

3. The apparatus of claim 1, wherein the performance indication comprises a signal-to-noise ratio (SNR) corresponding to the received signal.

4. The apparatus of claim 1, wherein:
the at least one communication processor comprises at least part of a modem; and
the wireless circuitry comprises preprocessing wireless circuitry.

5. The apparatus of claim 4, wherein the preprocessing wireless circuitry comprises at least one of:
at least part of a wireless receiver; or
at least part of a radio-frequency front-end.

6. The apparatus of claim 1, wherein:
the at least one communication processor comprises at least part of a baseband processor; and
the wireless circuitry comprises preprocessing wireless circuitry.

7. The apparatus of claim 1, further comprising:
at least one first integrated circuit chip comprising the at least one communication processor; and
at least one second integrated circuit chip coupled to the at least one first integrated circuit chip, the at least one second integrated circuit chip comprising the wireless circuitry.

8. The apparatus of claim 1, wherein:
the at least one communication processor is configured to determine the performance indication corresponding to the received signal post frequency down-conversion and post analog-to-digital conversion; and
the jammer detector is configured to detect the first jamming signal and the second jamming signal using a preprocessed signal.

9. The apparatus of claim 8, wherein:
the preprocessed signal comprises an analog signal that is pre frequency down-conversion by a mixer.

10. The apparatus of claim 1, wherein:
the jammer detector comprises:
at least one register configured to store the jammer detection threshold; and
a controller circuit coupled to the at least one register, and the controller circuit is configured to:
perform a comparison including a characteristic of the received signal and the jammer detection threshold using the at least one register; and
detect the first jamming signal based on the comparison.

11. The apparatus of claim 10, wherein the at least one communication processor is configured to:
perform a comparison including the performance indication corresponding to the received signal and a performance threshold;
determine to adjust the jammer detection threshold to produce the adjusted jammer detection threshold based on the comparison by the at least one communication processor; and
load the adjusted jammer detection threshold into the at least one register.

12. The apparatus of claim 11, wherein the at least one communication processor is configured to:
determine to decrease the jammer detection threshold to produce a decreased jammer detection threshold based on the performance indication corresponding to the received signal being greater than the performance threshold.

13. The apparatus of claim 10, wherein the characteristic of the received signal comprises a power of the received signal.

14. The apparatus of claim 1, wherein the jammer detector is configured to:
perform a countermeasure responsive to detection of the first jamming signal.

15. The apparatus of claim 14, wherein the jammer detector is configured to:
activate at least one filter to perform the countermeasure responsive to the detection of the first jamming signal.

16. The apparatus of claim 1, wherein the at least one communication processor is configured to:
establish an initial jammer detection threshold based on one or more operational conditions.

17. The apparatus of claim 16, wherein the one or more operational conditions comprise at least one of:
location of the apparatus, handsfree status, radio usage status, wired connectivity status, or transmit power.

18. The apparatus of claim 16, wherein the at least one communication processor is configured to:
access a data structure that includes multiple entries to ascertain the initial jammer detection threshold, each entry respectively associated with at least one value for at least a portion of the one or more operational conditions.

19. The apparatus of claim 18, wherein the at least one communication processor comprises at least a portion of an artificial intelligence (AI) engine.

20. The apparatus of claim 16, wherein the at least one communication processor is configured to:
store multiple samples, each sample associating a respective jammer detection threshold with at least one value for at least a portion of the one or more operational conditions; and
employ unsupervised machine learning to the multiple samples to bin the multiple samples into categorical ranges of the one or more operational conditions.

21. The apparatus of claim 16, wherein the at least one communication processor is configured to:
use at least one machine learning algorithm to determine the initial jammer detection threshold; and
load the initial jammer detection threshold into at least one register that is associated with the jammer detector,
wherein the jammer detection threshold comprises the initial jammer detection threshold.

22. The apparatus of claim 17, wherein the at least one communication processor is further configured to:
establish the initial jammer detection threshold using an unsupervised machine learning model that bins relationships between jammer detection thresholds and the one or more operational conditions.

23. The apparatus of claim 22, wherein the at least one communication processor is further configured to:
store multiple samples, each sample including a respective jammer detection threshold associated with at least one value for at least a portion of the one or more operational conditions; and
bin the multiple samples into categorical ranges of the one or more operational conditions.

24. The apparatus of claim 1, further comprising:
a display screen; and
one or more processors coupled to the display screen and at least a portion of the wireless circuitry, the one or more processors configured to present one or more graphical images on the display screen based on one or more wireless signals communicated using the wireless circuitry, the one or more processors comprising the at least one communication processor.

25. A method for adaptive jammer detection, the method comprising:

detecting, by jammer detection circuitry, a first jamming signal based on a first jammer detection threshold;

determining, by at least one communication processor, a performance indication corresponding to a received signal;

adjusting, by the at least one communication processor, the first jammer detection threshold based on the performance indication to produce a second jammer detection threshold;

detecting, by the jammer detection circuitry, a second jamming signal based on the second jammer detection threshold;

comparing a performance threshold and the performance indication corresponding to the received signal;

determining to adjust the first jammer detection threshold to produce the second jammer detection threshold based on the comparing; and loading at least one register with the second jammer detection threshold based on the determining to adjust the first jammer detection threshold.

26. The method of claim 25, further comprising:

initializing the first jammer detection threshold using a machine learning model that ascertains relationships between jammer detection thresholds and one or more operational conditions.

* * * * *